United States Patent
Tsuchiya

(10) Patent No.: US 9,375,951 B2
(45) Date of Patent: Jun. 28, 2016

(54) INKJET RECORDING DEVICE

(71) Applicant: MIMAKI ENGINEERING CO., LTD., Nagano (JP)

(72) Inventor: Atsushi Tsuchiya, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/426,388

(22) PCT Filed: Sep. 10, 2013

(86) PCT No.: PCT/JP2013/074406
§ 371 (c)(1),
(2) Date: Mar. 6, 2015

(87) PCT Pub. No.: WO2014/038712
PCT Pub. Date: Mar. 13, 2014

(65) Prior Publication Data
US 2015/0224793 A1   Aug. 13, 2015

(30) Foreign Application Priority Data

Sep. 10, 2012 (JP) ................................. 2012-199007
Dec. 17, 2012 (JP) ................................. 2012-275186

(51) Int. Cl.
*B41J 11/00* (2006.01)
*C09D 11/101* (2014.01)

(52) U.S. Cl.
CPC ............. *B41J 11/002* (2013.01); *C09D 11/101* (2013.01)

(58) Field of Classification Search
CPC ............................. B41J 11/002; C09D 11/101
USPC ........................ 347/16, 37, 101, 102
See application file for complete search history.

(56) References Cited

U.S. PATENT DOCUMENTS 8,382,274 B2 * 2/2013 Mitsuzawa ..................... 347/102
8,529,009 B2 * 9/2013 Onishi ............................. 347/16
(Continued)

FOREIGN PATENT DOCUMENTS

JP    2005-219401    8/2005
JP    2009-226622    10/2009
(Continued)

OTHER PUBLICATIONS

"International Search Report (Form PCT/ISA/210)", mailed on Oct. 15, 2013, with English translation thereof, pp. 1-3.
(Continued)

*Primary Examiner* — Anh T. N. Vo
(74) *Attorney, Agent, or Firm* — Jiang Chyun Intellectual Property Office

(57) ABSTRACT

An inkjet recording device is provided. Two rails are each provided on left and right sides of a printer head, and three LED modules are provided on inner rows In and one LED module is provided on outer rows of the rails. These LED modules can move on the rails in a sub scanning direction. At a position, the LED modules become adjacent in a main scanning direction, whereby a total quantity of light becomes "200". At other positions, the quantity of light is "100". In this invention, providing the LED modules movably on the outer rows enables to configure a curing section at an arbitrary position, so that a required quantity of light can be obtained, whereby the printing speed does is not decreased; and further, the number of the LED modules can be suppressed, and cost for an ultraviolet lamps of a carriage can be reduced.

10 Claims, 32 Drawing Sheets

(56) References Cited

U.S. PATENT DOCUMENTS

| | | | |
|---|---|---|---|
| 8,602,548 B2 * | 12/2013 | Miyabayashi | 347/102 |
| 8,764,153 B2 * | 7/2014 | Sanada | 347/16 |
| 8,871,311 B2 * | 10/2014 | Gharbi et al. | 427/508 |
| 8,888,270 B2 * | 11/2014 | Kachi | 347/102 |

FOREIGN PATENT DOCUMENTS

| | | |
|---|---|---|
| JP | 2010-284977 | 12/2010 |
| JP | 2012-96407 | 5/2012 |
| JP | 2012-106473 | 6/2012 |

OTHER PUBLICATIONS

"1st Office Action of China Counterpart Application", issued on Sep. 25, 2015, p. 1-p. 11, with English translation thereof.

\* cited by examiner

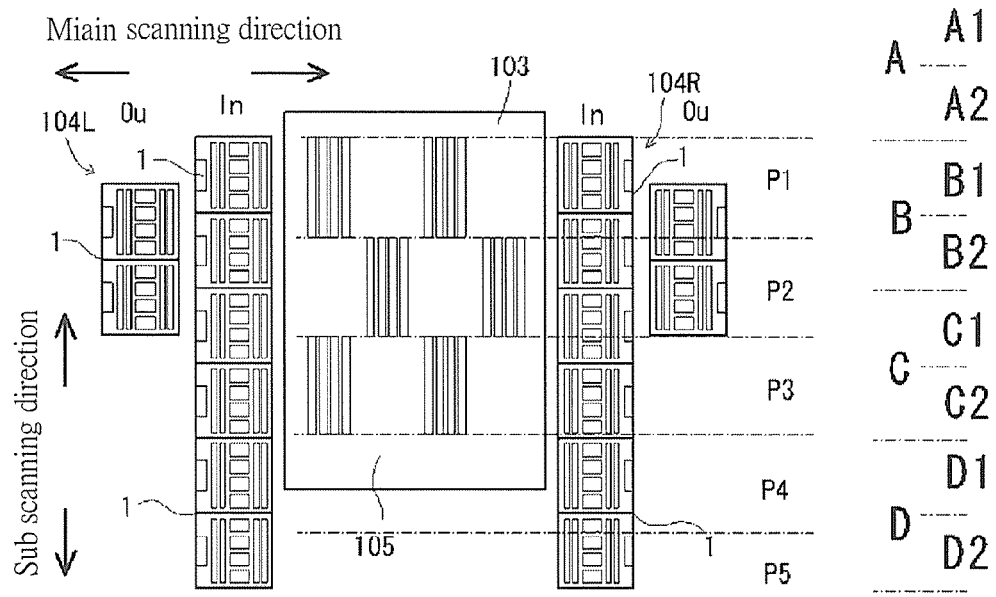
FIG. 15 A
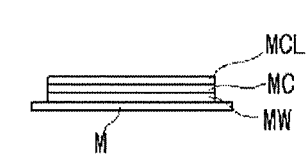 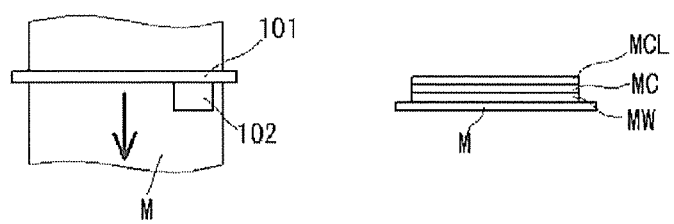
FIG. 15 B     FIG. 15 C

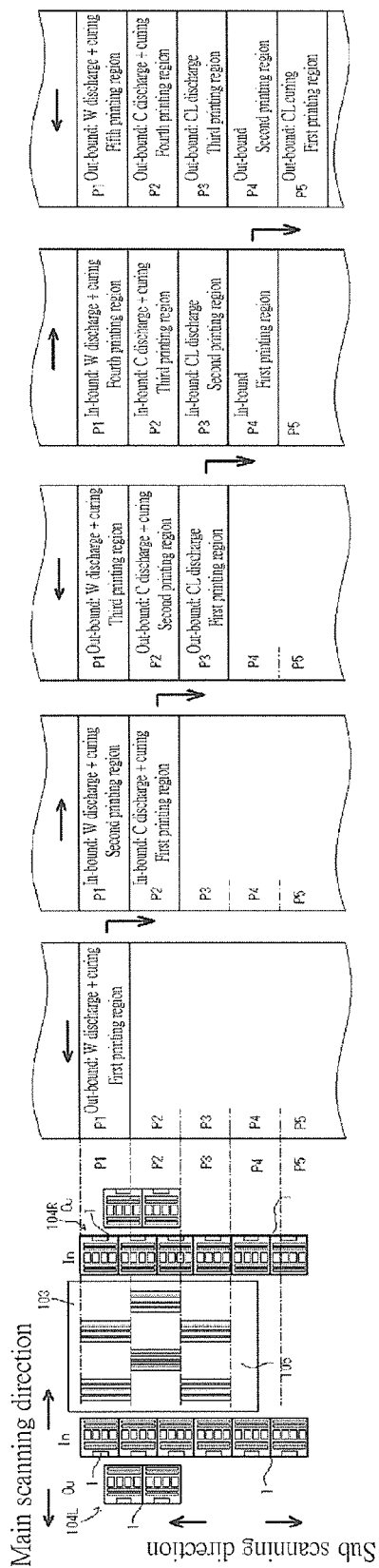

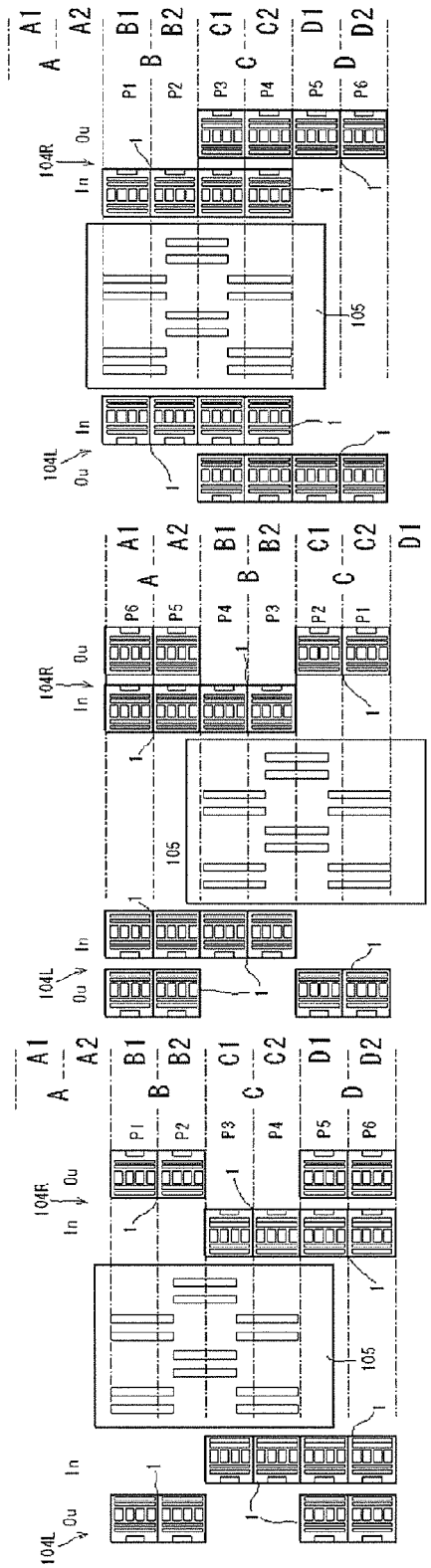
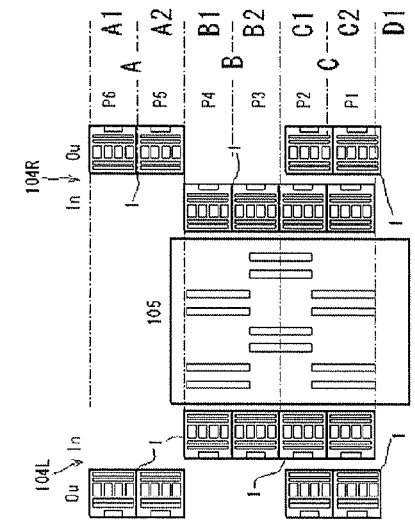
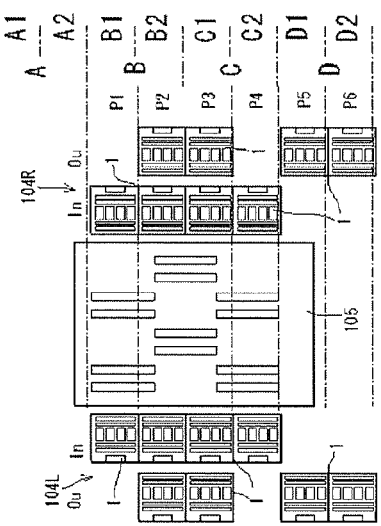
FIG. 17A  FIG. 17B  FIG. 17C  FIG. 17D  FIG. 17E

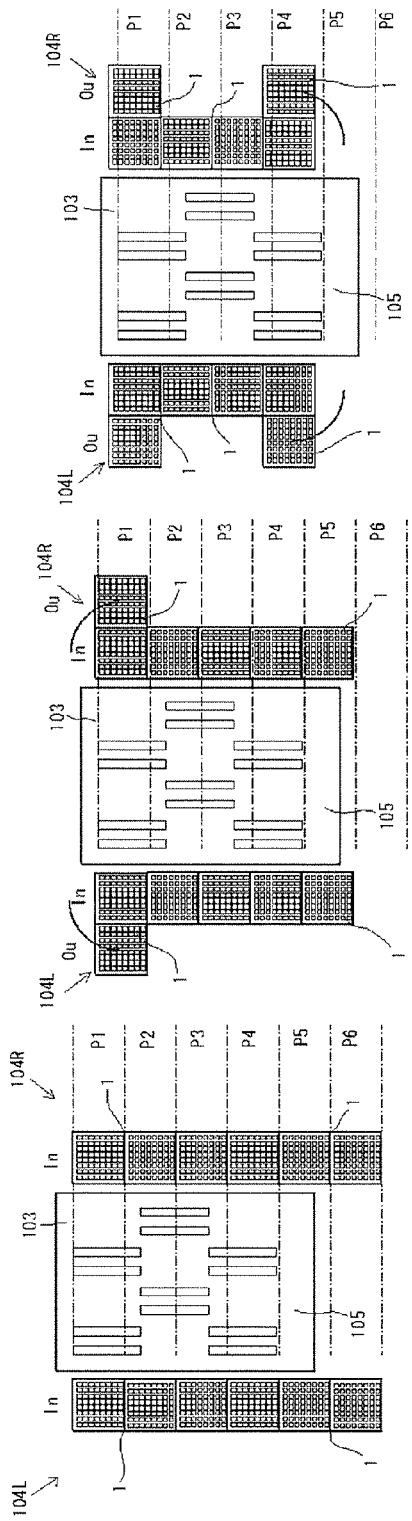
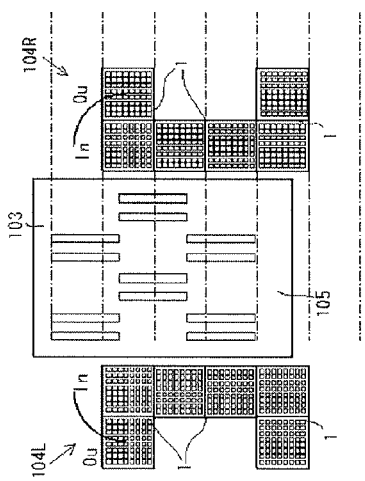
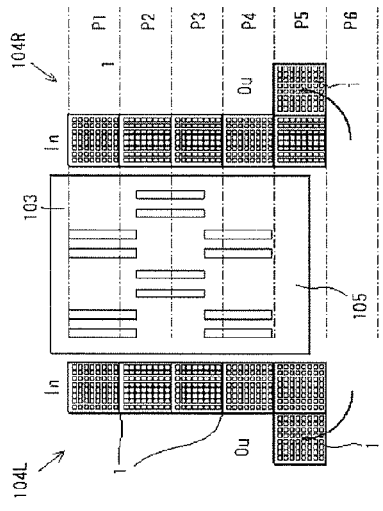
FIG. 29 A
FIG. 29 B
FIG. 29 C
FIG. 29 D
FIG. 29 E

INKJET RECORDING DEVICE

TECHNICAL FIELD

The present invention relates to an inkjet recording device that irradiates light onto ink discharged onto a medium and cures the ink.

BACKGROUND ART

Conventionally, an inkjet printer described in Patent Document 1 is known. This inkjet printer includes a holder that relatively moves in a main scanning direction perpendicularly intersecting a printing direction with respect to a medium that is a print target, an ink head provided on the holder, and a first ultraviolet lamp and a second ultraviolet lamp provided on both right and left sides of the holder in the main scanning direction. The first ultraviolet lamp and the second ultraviolet lamp can move in a sub scanning direction (the direction perpendicularly intersecting the main scanning direction). The first ultraviolet lamp and the second ultraviolet lamp are driven by a motor. The motor is provided at a part of the holder. A rotation shaft of the motor projects from one end side of a side surface of the holder, and a pulley is provided on the rotation shaft.

Further, a rotation shaft also projects to the other end side of the side surface of the holder and a pulley is also provided at a tip of this rotation shaft. A drive belt is bridged over the pulleys. Further, the other end of the rotation shaft is projected to a side surface of the holder on the opposite side, and a pulley is also provided on this other end. Moreover, a rotation shaft is independently provided at a position coaxial to the rotation shaft of the motor, and this rotation shaft also projects from the side surface of the holder, and a pulley is provided thereon. A drive belt is similarly bridged over these pulleys as well.

Further, a guide rail is provided in the sub scanning direction on a lower side of a side surface of the holder. The first ultraviolet lamp and the second ultraviolet lamp are movably arranged on the guide rails. Further, upper portions of the first ultraviolet lamp and the second ultraviolet lamp are attached to the drive belts.

In this inkjet printer, the first ultraviolet lamp and the second ultraviolet lamp are moved forward (printing direction of the medium) by driving the motor, and offsets an effective irradiation region from a printing region in the sub scanning direction. Ultraviolet curing type ink injected from the ink head while moving in the main scanning direction adheres to the printing region in a recording paper. The adhered ink has its effective irradiation region offset in the sub scanning direction even when the holder moves in the main scanning direction, so the ink that has adhered to the recording paper is not completely irradiated with the ultraviolet ray, whereby the ink is not cured.

Next, in an in-bound of the holder in the main scanning direction, the recording paper is in a state of having been moved by an amount corresponding to the printing region, so the print region of the ink injected in this in-bound enters into the effective irradiation region, the ink is irradiated with the ultraviolet ray, and the ink is cured. As above, by injecting the ink in an out-bound and ultraviolet-irradiating in the in-bound, ultraviolet irradiation is performed for curing after a certain time has elapsed from the ink injection, so the ink is spread on the medium and a surface thereof becomes flat, and as a whole, glossy printing can be obtained.

On the other hand, by driving the first ultraviolet lamp and the second ultraviolet lamp by the motor and causing the printing region and the effective irradiation region to match in the sub scanning direction, ultraviolet irradiation can be performed onto the ink right after printing. Due to this, curing takes place before the injected ink is spread, so the surface becomes granular and matted.

PRIOR ART DOCUMENT

Patent Document

Patent Document 1: JP 2010-284977 A

SUMMARY OF THE INVENTION

Problem to be Solved by the Invention

However, the conventional inkjet printer merely provides the first ultraviolet lamp and the second ultraviolet lamp on both sides of the holder in the main scanning direction, and moves them in the sub scanning direction to change positions of the ultraviolet lamps. That is, in the conventional inkjet printer, glossy printing as a whole and printing to form the granular and matted surface are merely enabled by moving the first ultraviolet lamp and the second ultraviolet lamp in the sub scanning direction.

Here, in printing, there are provisional curing that delivers weak ultraviolet ray as needed to suppress ink smearing and primary curing that completely performs curing by irradiation of strong ultraviolet ray, so those that can obtain a large quantity of light enabling the primary curing need to be used for the ultraviolet lamps.

For example, in case of forming a color layer on a medium, weak ultraviolet ray is delivered after having discharged color ink for provisional curing, and thereafter strong ultraviolet ray is delivered for primary curing. In this case, a quantity of light of a light source of the ultraviolet lamp on a downstream side in the sub scanning direction simply needs to be set large, however, in a configuration that inverts the feeding direction of the medium, since the opposite side of the aforementioned downstream side becomes the downstream, a quantity of light of a light source on this downstream side also needs to be made large.

Further, in case of directly and completely curing the ink after discharge, the strong ultraviolet ray needs to be delivered to the position where the printing took place, so quantity of light of light sources of all of the ultraviolet lamps needs to be made large. As a result, the quantity of light of the ultraviolet lamps as a whole needs to be made large, and there have been a problem that cost for the light sources increases.

On the other hand, if the quantity of light of the ultraviolet ray is decreased to reduce cost of the ultraviolet lamps, a long irradiation time becomes necessary, whereby printing speed is decreased.

Thus, the invention aims to be able to obtain an ultraviolet intensity as needed at low cost without decreasing printing speed.

Solutions to the Problem

An inkjet recording device according to the present invention is an inkjet recording device configured to move a printer head in a main scanning direction relative to a medium while discharging ink onto the medium, and including a lamp that causes the discharged ink to be exposed and cured in the main scanning direction of the printer head, and characterized in including: a plurality of irradiation units configuring the lamp and provided in the main scanning direction of the printer head; and a retaining unit that retains at least one irradiation unit among the plurality of irradiation units to be movable in a sub scanning direction perpendicularly intersecting the main scanning direction.

According to the present invention, a large quantity of light can be obtained by quantities of light of one irradiation unit and other irradiation units are combined in the main scanning direction by moving the one irradiation unit (for example, an LED module on an outer row in the embodiments) in the sub scanning direction to become adjacent to other irradiation units (for example, LED modules on an inner row in the embodiments) in the main scanning direction by a moving unit. In other words, one irradiation unit may be configured to have different total quantities of light at the position where it is adjacent to other irradiation units and at other positions. According to such a configuration, the one irradiation unit may be moved to the position where the large quantity of light is required, and combine it with other adjacent irradiation units to obtain a large quantity of light as a result, so irradiation units with the large quantity of light does not need to be used. Due to this, necessary quantity of light can be obtained at low cost without decreasing printing speed.

Further, preferably, the retaining unit retains the plurality of irradiation units at a specific position in the sub scanning direction, and a total quantity of light in the main scanning direction at the position is changed for a plurality of printing methods.

That is, by moving the plurality of irradiation units to the specific position in the sub scanning direction and retaining the same, the total quantity of light in the main scanning direction can be made large at the necessary position. Further, if the irradiation units are moved to another position and retained, the total quantity of light in the main scanning direction can be made large at the position.

As above, the quantity of light at the arbitrary position can be made large by moving and retaining the irradiation unit. In other words, the total quantities of light can be made to differ at the arbitrary position and at other positions.

Further, preferably the retaining unit creates contrasts in the total quantity of light in the main scanning direction between a specific position and other positions by retaining the plurality of irradiation units at the specific position in the sub scanning direction, and when a feeding direction of the medium relative to the printer head changes from a forward direction to a reverse direction, the retaining unit is configured to be capable of moving the irradiation units in the sub scanning direction so as to invert the total quantity of light in the forward direction.

That is, in case of having switched the feeding direction of the medium from the forward direction to the reverse direction, by the contrast in the total quantity of light (intensity distribution) being inverted in the sub scanning direction, light can be delivered onto the medium similar to the forward direction. Due to this, printing can be performed in the reverse direction without resetting the medium.

Further, preferably, in case of a magnitude of the total quantity of light in the main scanning direction at the specific position being made to differ from those of other positions, and provisionally curing the other positions with a small quantity of light and thereafter primarily curing the specific position, when a feeding direction of the medium is a forward direction, the retaining unit moves and retains the irradiation unit so that a total quantity of light becomes large at a downstream side of the printer head relative to the medium, and when the feeding direction of the medium is a reverse direction, the retaining unit moves and retains the irradiation unit to arrange the irradiation unit to be in an arrangement that is inverted in the sub scanning direction of the printer head, so that the total quantity of light becomes large at the downstream side of the printer head relative to the medium becomes large.

For example, in case of performing the provisional curing initially on a first print layer, and then performing the complete curing, the total quantity of light on the downstream side of the medium is made large. At this occasion, in case where the feeding direction of the medium changes from the forward direction to the reverse direction, the retaining unit can arrange the irradiation units to be in an arrangement inverted in the sub scanning direction so that the total quantity of light on the downstream side of the medium is made large similarly to the case of the forward direction. Due to this, the printing can be performed in the reverse direction without resetting the medium.

Further, preferably, the retaining units are further provided at least on one side of the printer head from a printer head side to the main scanning direction, as an inner row and an outer row, and the irradiation units are movably retained in the sub scanning direction in the inner row and the outer row.

According to such a configuration, the irradiation units can be moved in the sub scanning direction as a whole, so the irradiation range by the irradiation unit can be set wide, and the irradiation units on the inner row and the outer row can be made to be adjacent within this irradiation range so as to make the quantities of light different.

Further, preferably, the irradiation units are configured of module members that have a large number of light emitting elements arranged in horizontal and vertical directions on a substrate, and include a main scanning direction group of light sources configured to be capable of independently controlling the light emitting elements arranged in the main scanning direction as a whole among the large number of light emitting elements; and a sub scanning direction group of light sources configured to be capable of independently controlling the light emitting elements arranged in the sub scanning direction as a whole among the large number of light emitting elements.

As above, by using a large number of light emitting elements in groups in the main scanning direction and the sub scanning direction as independently controllable light sources, sufficient illuminance can be obtained without using light sources with the effect of strong illuminance. Further, since the shape of the light sources can be set arbitrarily, adaptation to irradiation conditions that differ depending on print heads is easy. Further, since the light emitting elements included in the light sources are independently controlled as a whole, an irradiation unit does not need to be provided for control for each of the large number of light emitting elements. Due to this, the configuration of the irradiation units can be simplified, and manufactured at low cost.

Further, preferably, the sub scanning direction groups of light sources are formed on both sides of the substrate, and the main scanning direction group of light sources is formed between the sub scanning direction groups.

Due to this, the sub scanning direction groups of light sources are formed by being apart in the main scanning direction on the substrate, so ultraviolet irradiation time for the ink can be adjusted. For example, a distance from the printer head becomes different between in case of lighting the light sources on one side and in case of lighting the light source on the other side while printing in the main scanning direction, so timing to deliver the ultraviolet ray onto the discharged ink becomes different.

Further, a plurality of main scanning direction groups of light sources may further be included, and said light sources may be formed adjacently in the sub scanning direction, and alternatively, a plurality of sub scanning direction groups of light sources may further be included, and said light sources may be formed adjacently in the main scanning direction.

As above, by forming the light sources to be adjacent in the main scanning direction or the sub scanning direction, fine control becomes possible. Due to this, banding can be reduced, and high quality printing is enabled.

Effects of the Invention

According to the present invention, by configuring at least one irradiation unit among the plurality of irradiation units provided in the main scanning direction to be movable in the sub scanning direction, the quantity of light necessary at the specific position can be obtained, whereby the quantity of light as needed can be obtained at low cost. Further, the printing speed does not have to be reduced.

BRIEF DESCRIPTION OF THE DRAWINGS

FIG. 15A to FIG. 15C are explanatory diagrams showing a setting example of the ultraviolet lamp of this inkjet printer.

FIG. 16A to FIG. 16E are explanatory diagrams showing an example of the operation of this inkjet printer.

FIG. 17A to FIG. 17E are explanatory diagrams showing another configuration example of the ultraviolet lamp.

FIG. 29A to FIG. 29E are explanatory diagrams showing another configuration example of a rotary type ultraviolet lamp.

EMBODIMENTS OF THE INVENTION

Embodiment 1

Figure 1:
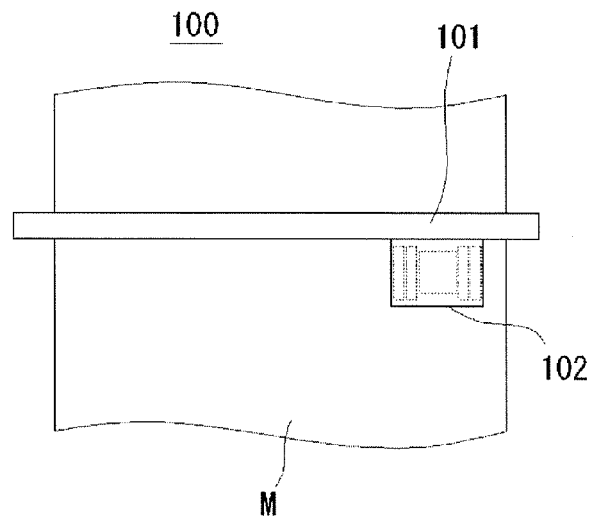
FIG. 1 is a configuration diagram showing a structure of an inkjet printer according to an embodiment 1 of the invention.
Figure 2:
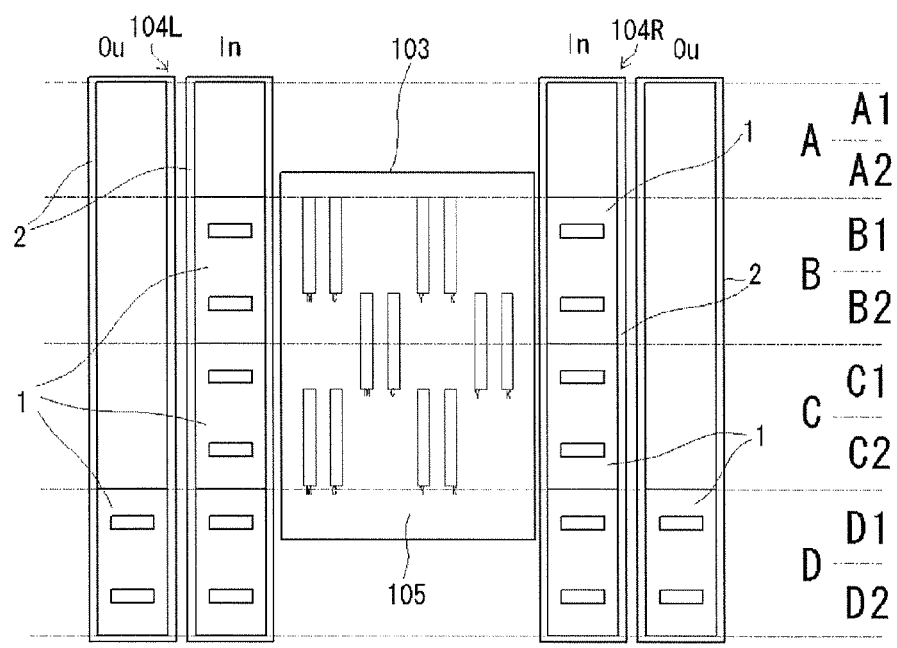
FIG. 2 is a plan view showing an ink head of the inkjet printer of FIG. 1.

FIG. 1 is a configuration diagram showing a structure of an inkjet printer according to an embodiment 1 of the invention. FIG. 2 is a plan view showing an ink head of the inkjet printer of FIG. 1. This inkjet printer 100 includes a carriage 102 that moves along a Y bar 101 provided in a main scanning direction. The carriage 102 is controlled to move in a direction perpendicularly intersecting a printing direction of a medium M (main scanning direction). The carriage 102 includes a holder 103, and a first ultraviolet lamp 104R and a second ultraviolet lamp 104L provided on both sides of the holder 103 in the main scanning direction. A printer head 105 is provided in the holder 103. The printer head 105 forms a substantially elongate head by arranging a plurality of head sections by slightly offsetting them in the main scanning direction, and is configured to obtain a wide printing region. The first ultraviolet lamps 104 and the second ultraviolet lamps 104 are arranged symmetrically with respect to the holder 103, and have symmetric structures.

Each of the ultraviolet lamps 104 is configured of inner rows In each configured of three LED modules 1 being lighting units, and outer rows Ou each configured of one LED module 1 being the lighting unit. The inner rows In and outer rows Ou are formed by being oriented in a sub scanning direction perpendicularly intersecting the main scanning direction. Further, the inner rows In and the outer rows Ou are configured of rails 2, two rows of which are provided on both sides of the holder 103 in parallel, and are provided in the main scanning direction. In other words, each LED module 1 is arranged respectively in the main scanning direction by being arranged within the rail 2. A length of each of the rails 2 is longer than a length of the holder 103 in the sub scanning direction, and projects out toward both sides of the holder in the sub scanning direction (up and down sides in the figure). Specifically, in an inner row In, in case the three LED modules 1 are arranged in the rail 2, a space corresponding to one LED module 1 is formed within the rail 2. In an outer row Ou, by arranging one LED module 1 in the rail 2, a space corresponding to three LED modules 1 is formed within the rail 2. Due to this, the rails 2 may cause the LED modules 1 to move along and within the rails.

It should be noted that for the sake of explanation, positions of the LED modules 1 within the rails 2 are divided into four from an upper side in the drawing, and are denoted as A to D. Further, the positions A to D will be described by being divided into A1, A2, B1, B2, C1, C2, D1, and D2 in the main scanning direction. Further, an intermediate position between the positions A, B will be denoted as a position AB, an intermediate position between the positions B, C will be denoted as a position BC, and an intermediate position between the positions C, D will be denoted as a position CD.

Figure 3:
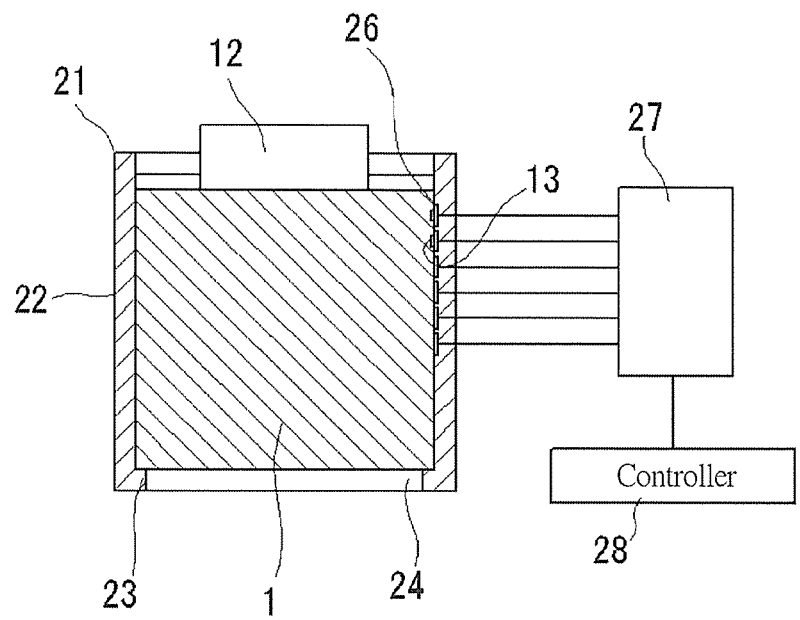
FIG. 3 is a cross sectional view showing a rail.
Figure 4:
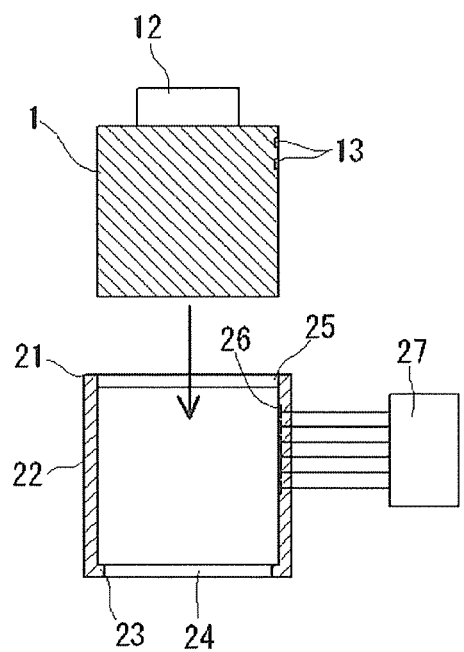
FIG. 4 is an explanatory diagram showing an inserting method of an LED module to the rail.

FIG. 3 is a cross sectional view showing a rail. A rail 2 is configured of an elongate box-shaped main body 21, and a bottom 23 extends inwardly from lower parts of side surfaces 22 and an opening 24 is formed on the bottom 23. LED light sources 11 of the LED modules 1 are exposed from this opening 24 toward a lower side of the rail 2. An upper opening 25 for inserting the LED modules 1 is provided at an upper part of the rail 2. As shown in FIG. 4, the LED module 1 is inserted into the rail 2 from the upper opening 25. The LED module 1 is supported by the bottom 23 in the rail 2, and is manually movable in a longitudinal direction along the rail 2. A tab section 12 is provided at an upper part of the LED module 1. Such a configuration can easily mount the LED module 1 on the rail 2, and further, the LED module 1 can easily be moved manually along the rail 2 by pinching the tab section 12.

Further, a plurality of rail electrodes 26 is provided in parallel in the longitudinal direction on the side surface 22 of the rail 2. Electrodes 13 corresponding to the rail electrodes 26 are provided on side surfaces of the LED module 1, and the electrodes 13 and the rail electrodes 26 are always in a contact state even when the LED module 1 is moved within the rail 2, and electric power is supplied to a specific LED module 1 by the contact of the electrodes 13 and the rail electrodes 26. The number of the rail electrodes 26 is determined by the mounted number of the LED modules 1 on the rail 2. The rail electrodes 26 are connected to a power source 27. Power supply and voltage control of the respective LED modules 1 are performed by a controller 28.

The LED module 1 can be fixed at a position where it is moved on the rail 2. For example, a known structure such as fixing the LED module 1 on the rail 2 by pins can be used.

Figure 5:
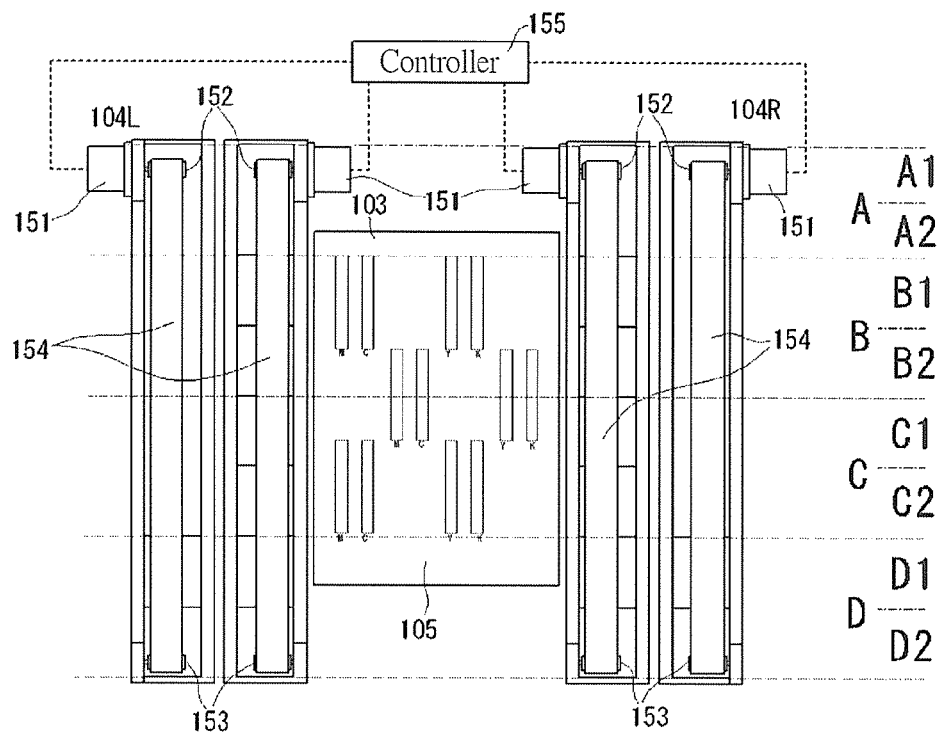
FIG. 5 is a configuration diagram showing a modified example of an ultraviolet lamp shown in FIG. 2.

FIG. 5 is a configuration diagram showing a modified example of the ultraviolet lamps shown in FIG. 2. In each ultraviolet lamps 104, a step motor 151 is provided at one end side in the longitudinal direction on a side surface of the corresponding rail 2, and a pulley 152 is provided to a rotation shaft of this step motor 151. A rotation shaft is provided also on the other end side in the longitudinal direction of the rails 2, and a pulley 153 is provided to this rotation shaft. Further, a belt 154 is bridged over these pulleys 152, 153, and the respective LED modules 1 are fixed with respect to this belt 154. The LED modules 1 can be moved to the predetermined positions on the rail 2 by supplying predetermined pulsed electric power to the step motor 151. Control of the step motor 151 is performed by a controller 155.

In the above, the structure for the case of arranging the LED modules 1 on both sides of the holder 103 in plural rows in the sub scanning direction, however, this structure is merely an example. For example, two rows of plates having oblong shapes may be arranged on both sides of the holder 103, a plurality of openings may be provided in the sub scanning direction on the plates, and the LED modules 1 may be configured to be detachably attached to specific positions of the plates so that LED light sources 11 of the LED modules 1 are exposed downward from the openings (drawing is omitted).

[LED Module 1]

Figure 6:
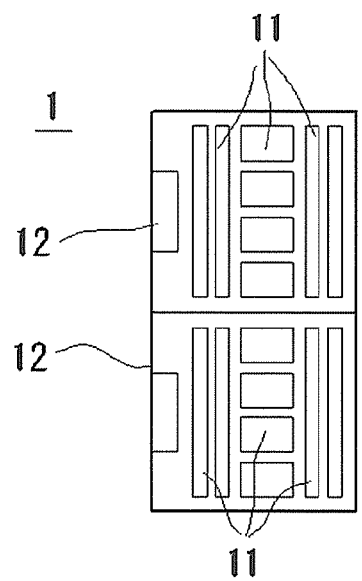
FIG. 6 is an explanatory diagram showing an example of the LED module.

FIG. 6 is an explanatory diagram showing an example of the LED modules. A main body shape of the LED module 1 forms one rectangular LED module 1 by coupling two square module members 12. The LED module 1 can adjust the ultraviolet irradiation amount by controlling the number of LED light sources 11 to be illuminated. In this embodiment, the LED light sources 11 formed in the LED module 1 are configured to be either all lit, or half lit. It should be noted that in the below description, an output of the LED module 1 will be expressed as "100" when all of the LED light sources 11 are lit, and "50" when half of them are lit. The lower limit will be "1". Further, an output range refers to a range from a minimum quantity of light to a maximum quantity of light of the LED module 1, and the quantity of light to be actually outputted is controlled within this range.

It should be noted that the arrangements of the LED light sources 11 in each LED module 1 is not limited to the example shown in FIG. 6. For example, the LED light sources 11 may be structured to be arranged in a matrix, or may be structured to be arranged in two rows. Further, each LED module 1 may have the same LED light sources 11 arranged therein, or may have different LED light sources 11 arranged therein.

Hereinbelow, configuration examples and operation examples of the ultraviolet lamps 104 will be described, however, these differ depending on print layers (color layer and the like) to be formed on the medium M, so the configuration examples and operation examples according to the present invention are not limited to those described below. Further, for the sake of the convenience, the structure and the like of the rails 2 will be omitted from the drawings.

Operation Example 1

Figure 7A:
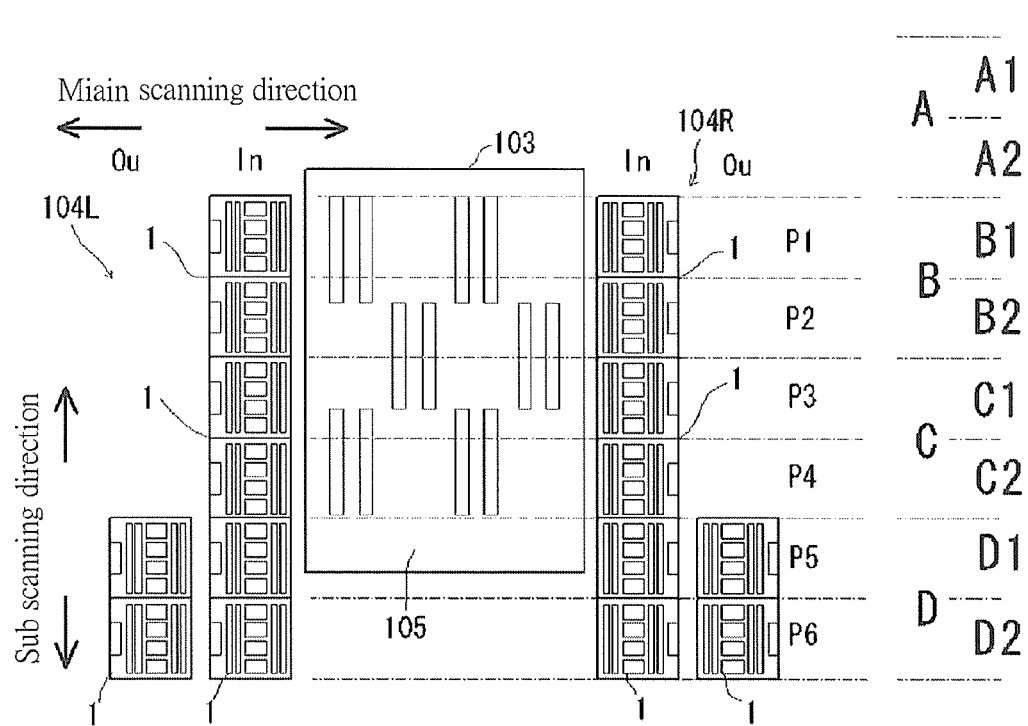
FIG. 7A to FIG. 7C are explanatory diagrams showing a setting example of the ultraviolet lamp of this inkjet printer.
Figures 7B, 7C:
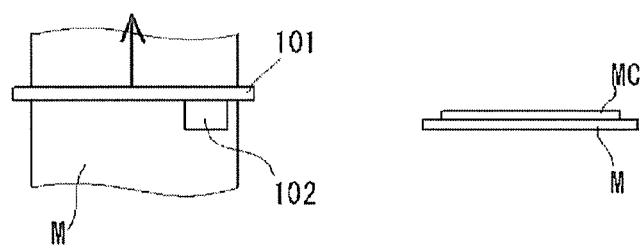

FIG. 7A to FIG. 7C, FIG. 9A to FIG. 9C, FIG. 11A to FIG. 11C, FIG. 13A to FIG. 13C, and FIG. 15A to FIG. 15C are explanatory diagrams showing setting examples of the ultraviolet lamp of this inkjet printer. FIG. 8A to FIG. 8C, FIG. 10A to FIG. 10C, FIG. 12A to FIG. 12 C, FIG. 14A to FIG. 14C, and FIG. 16A to FIG. 16E are explanatory diagrams showing examples of operation of the inkjet printer. In FIG. 7A to FIG. 7C, as shown in FIG. 7B, a relative movement direction of the medium M with respect to the carriage 102 becomes downward direction in the drawing (forward direction). Further, as shown in FIG. 7C, a color layer MC is to be formed on a surface of the medium M. In this case, the LED modules 1 are moved along the rails 2, positioned at a position B, a position C, and a position D in the inner rows In, and positioned at the position D in the outer rows Ou. Due to this, the LED modules 1 of the inner rows In and the LED modules 1 of the outer row Ou are made to be adjacent at the position D. Three head sections on the left side of the printer head 105 in the drawing are M (Magenta) and C (Cyan), and the three head sections on the right side are Y (Yellow) and K (black).

Further, a range by which the printer head 105 discharges ink by one pass will be expressed as print widths P1 to P6. In the actual printing region, for example, in case where the printer head 105 discharges ink over print widths P1, P2 in one pass, the printing region having a width of print widths P1, P2 is formed by the movement in the main scanning direction. Further, in case where the printer head 105 discharges ink over print width P1 in one pass, the printing region having a width of print width P1 is to be formed.

[Formation of Color Layer MC]

In the case of the arrangement of the LED modules 1 shown in FIG. 7A to FIG. 7C, the positions B, C become pinning sections, and the position D becomes a curing section. The output of each LED module 1 is performed by lighting the LED light sources 11 and controlling the quantity of light. By focusing on the curing section, the LED modules 1 in the inner rows In are positioned in the position D, and also the LED modules 1 in the outer rows Ou are positioned in the position D, so the output "100" for the rows are combined so that the output totaling to "200" is obtained as the total quantity of light in the main scanning direction. The pinning sections have the output of the LED modules 1 at the position B as "40", and the output of the LED modules 1 at the position C as "10 to 30". In this case, by performing the pinning of the color ink in steps, the total quantity of light by the pinning sections becomes "100".

Further, in the ultraviolet lamps 104 on one side, the output range of the ultraviolet ray at the position B and the position C becomes "1" to "100". At the position D, since the LED modules 1 are arranged on the inner rows In and the outer rows Ou, the output range thereof becomes "1" to "200". As above, by moving the LED modules in the outer rows Ou in the sub scanning direction, the output range at any arbitrary position can be set to "1" to "200", so the same number of LED modules 1 do not need to be arranged on the inner row and the outer row. Alternatively, LED modules 1 with a large quantity of light do not need to be used.

Figures 8A, 8B, 8C:
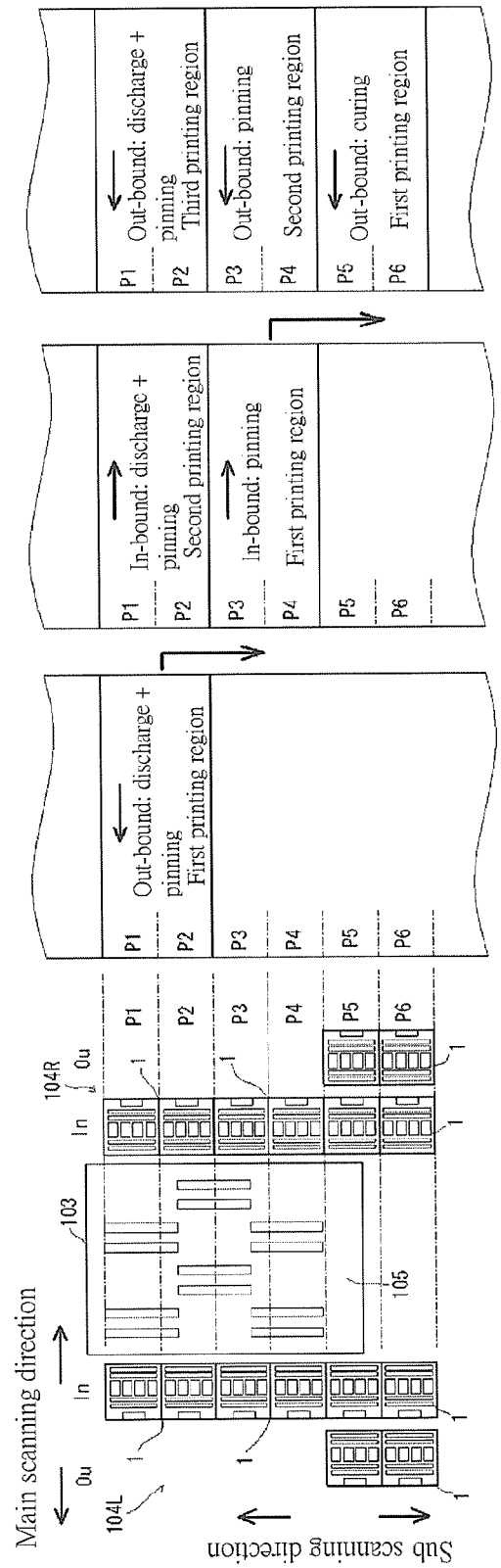
FIG. 8A to FIG. 8C are explanatory diagrams showing an example of an operation of this inkjet printer.

During the out-bound, as shown in FIG. 8A, the carriage 102 moves in the main scanning direction with respect to the medium M while the color ink is discharged from the printer head 105 over the print widths P1, P2. At this occasion, at the position B, the ink that has struck the medium M is prevented from spreading by the ultraviolet ray delivered at the output "40" in the pinning section, and a dot diameter thereof is controlled. It should be noted that in case of pinning, the ultraviolet ray is delivered from the ultraviolet lamps 104 on the right side of the drawing in the out-bound, and the ultraviolet ray is delivered from the ultraviolet lamps 104 on the left side within the drawing in the in-bound.

Next, as shown in FIG. 8B, after having exposed the ink by the LED modules 1 at the position B being the pinning section, the carriage 102 is relatively moved in the forward direction by P1, P2 (by one position) with respect to the medium M. Due to this, a first printing region of the medium M that was positioned in the position B is positioned in the position C. Then, during the in-bound, the exposure is performed at the output of "60" by the LED modules 1 at the position C on the first printing region. Together with this, the color ink is discharged from the printer head 105 over the print widths P1, P2 (second printing region), and the exposure is performed at the output of "40" by the LED modules 1 at the position B.

Next, as shown in FIG. 8C, the carriage 102 is relatively moved in the forward direction by P1, P2 (by one position) with respect to the medium M. For example, it is moved over one position. Due to this, the first printing region of the medium M that was positioned in the position C is positioned in the position D. Further, the second printing region of the medium M that was positioned in the position B is positioned in the position C. Then, stronger ultraviolet ray is delivered by the curing section in the position D in the out-bound of the carriage 102 to completely cure the first printing region. Further, the exposure is performed at the output of "60" by the LED modules 1 at the position C on the second printing region. Together with this, the color ink is discharged from the printer head 105 over the print widths P1, P2 (third printing region), and the exposure is performed at the output of "40" by the LED modules 1 at the position B. Further, this procedure is repeated to continue printing.

Figure 9:
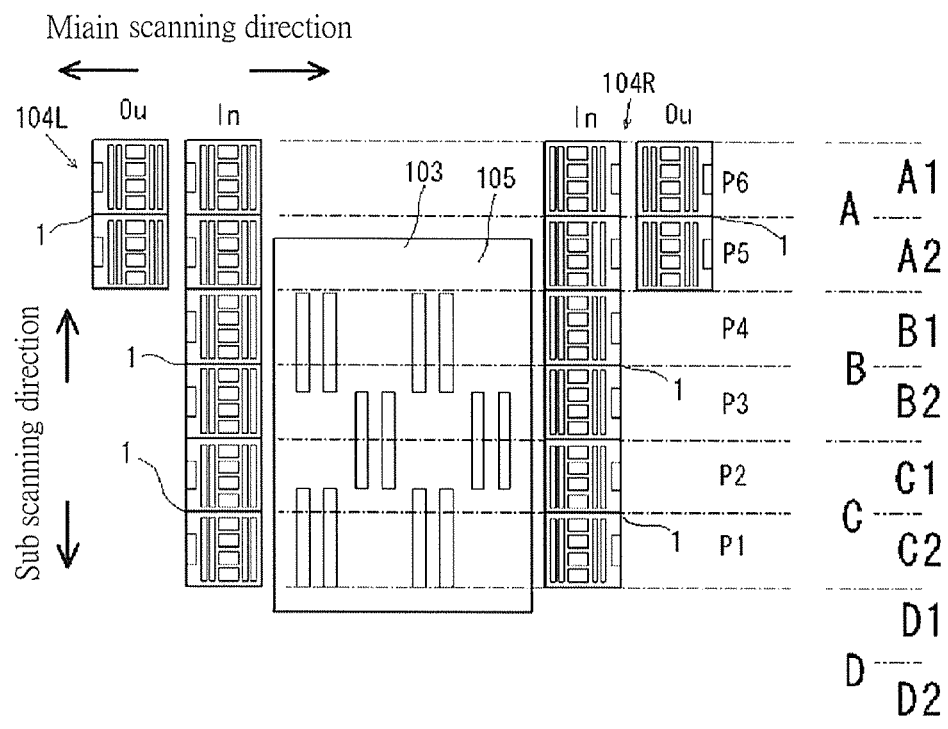
FIG. 9A to FIG. 9C are explanatory diagrams showing a setting example of the ultraviolet lamp of this inkjet printer.
Figure 9:
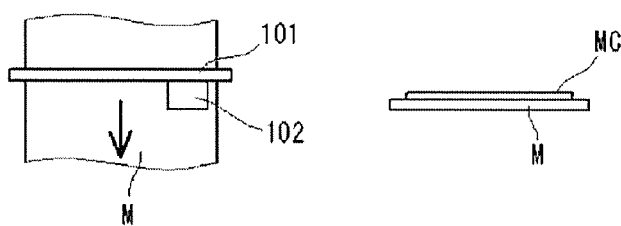
Figure 10:
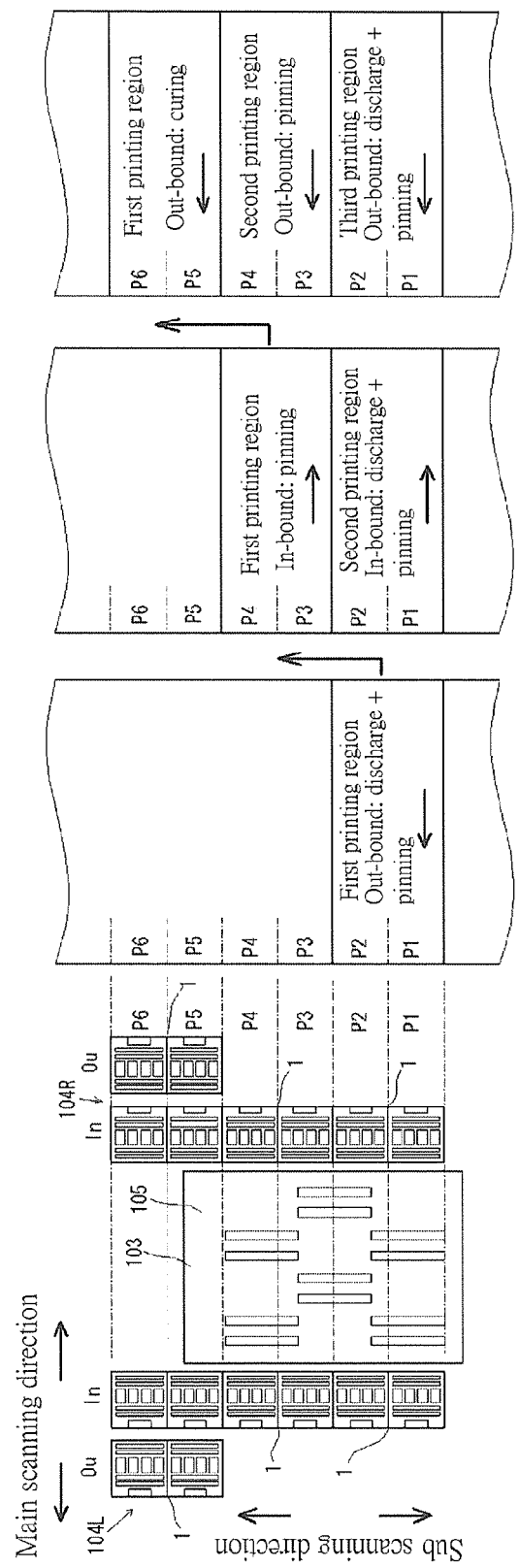
FIG. 10A to FIG. 10C are explanatory diagrams showing an example of the operation of this inkjet printer.

FIG. 9A to FIG. 9C are explanatory diagrams showing the case of inverting the arrangement of the LED modules 1 shown in FIG. 7A to FIG. 7C in the sub scanning direction. FIG. 10A to FIG. 10C are explanatory diagrams showing a printing operation in the case of FIG. 9A to FIG. 9C. In this case, the relative movement direction of the medium M with respect to the carriage 102 becomes upward direction (reverse direction) in the drawings.

In the case of the arrangement of the LED modules 1 shown in FIG. 9A to FIG. 9C, the position C and the position D become the pinning sections, and the position B becomes the curing section. By focusing on the curing section, the LED modules 1 in the inner rows In are positioned in the position B, and also the LED modules 1 in the outer rows Ou are positioned in the position B, and in assuming that the outputs thereof are each "100", the output totaling to "200" is obtained in the main scanning direction. The pinning sections have the output of the LED modules 1 at the position D as "40", and the output of the LED modules 1 at the position C as "60". In this case, by performing the pinning of the color ink in steps, the total amount of exposure by the pinning sections becomes "100".

Further, in the ultraviolet lamps 104 on one side, the output range of the ultraviolet ray at the position C and the position D becomes "1" to "100". At the position B, since the LED modules 1 are arranged on the inner rows In and the outer rows Ou, the output range thereof becomes "1" to "200". As above, by moving the LED modules in the outer rows Ou to move in the sub scanning direction, the output range at any arbitrary position can be set to "1" to "200", so the same number of LED modules 1 do not need to be arranged on the inner row and the outer row. Alternatively, LED modules 1 with a large quantity of light do not need to be used.

During the out-bound, as shown in FIG. 10A, the carriage 102 moves in the main scanning direction with respect to the medium M while the color ink is discharged from the printer head 105 over the print widths P1, P2. At this occasion, at the position D, the ink that has struck the medium M is prevented from spreading by the ultraviolet ray delivered at the output "40" in the pinning section, and the dot diameter thereof is controlled.

Next, as shown in FIG. 10B, after having exposed the ink by the LED modules 1 at the position D being the pinning section, the carriage 102 is relatively moved in the forward direction by P1, P2 (by one position) with respect to the medium M. Due to this, the first printing region of the medium M that was positioned in the position D is positioned in the position C. Then, during the in-bound, the exposure is performed at the output of "60" by the LED modules 1 at the position C on the first printing region. Together with this, the color ink is discharged from the printer head 105 over the print widths P1, P2 (second printing region), and the exposure is performed at the output of "40" by the LED modules 1 at the position D.

Next, as shown in FIG. 10C, the carriage 102 is relatively moved in the forward direction by P1, P2 (by one position) with respect to the medium M. For example, it is moved over one position. Due to this, the first printing region of the medium M that was positioned in the position C is positioned in the position B. Further, the second printing region of the medium M that was positioned in the position D is positioned in the position C. Then, ultraviolet ray is delivered by the curing section in the position B in the in-bound of the carriage 102, and the first printing region is completely cured. Further, the exposure is performed at the output of "60" by the LED modules 1 at the position C on the second printing region. Together with this, the color ink is discharged from the printer head 105 over the print widths P1, P2 (third printing region), and the exposure is performed at the output of "40" by the LED modules 1 at the position D. Further, this procedure is repeated to continue printing.

As above, by the arrangement that inverts the arrangement shown in FIG. 7A to FIG. 7C in the sub scanning direction, the inkjet printer medium M can relatively be moved in the reverse direction with respect to the carriage 102 to perform printing.

As shown above, in the present invention, the LED modules 1 in the outer rows Ou are moved in the sub scanning direction to combine the LED modules 1 in the inner rows In with the LED modules 1 in the outer rows Ou, so that the curing section can be configured at an arbitrary position. Due to this, the LED modules 1 do not need to be provided at each position in configuring the curing section. That is, since the curing section can be configured at any arbitrary position by providing the LED modules 1 movably in the outer rows Ou, the number of the LED modules 1 is suppressed, and cost of the ultraviolet lamps 104 for the carriage 102 can be reduced. Further, since the quantity of light required for the curing can be ensured, the printing speed is not decreased. Further, by configuring the LED modules 1 in the inner rows In and the outer rows Ou to be movable along the rails 2 in the sub scanning direction, a wide irradiation range can be obtained with less number of LED modules 1.

[Formation of Color Layer MC and White Layer MW]

Figure 11:
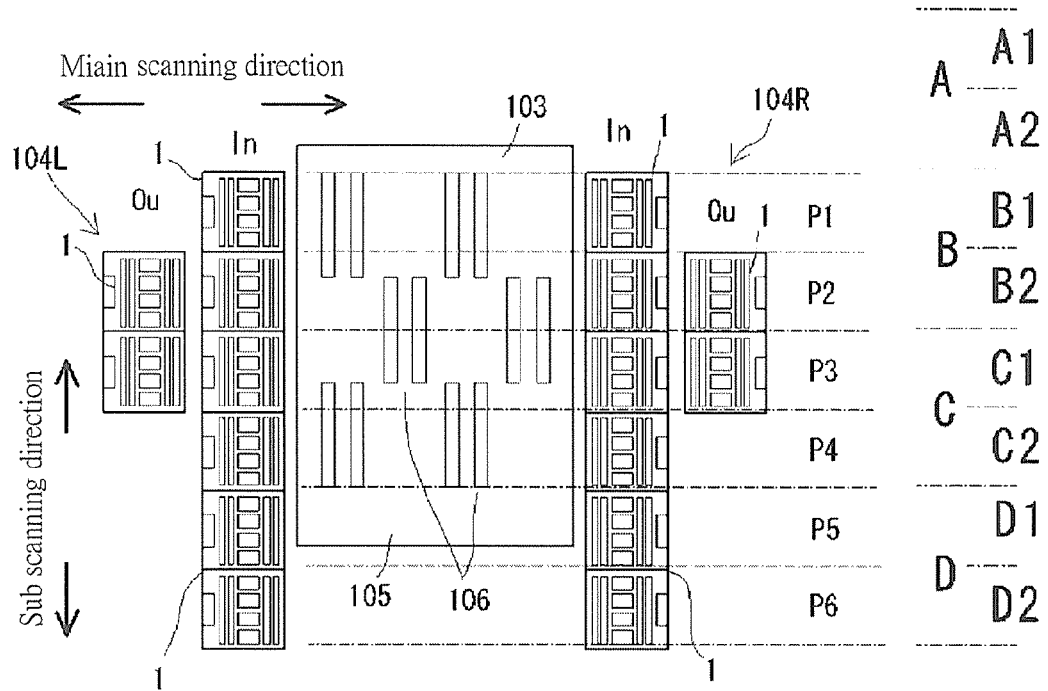
FIG. 11A to FIG. 11C are explanatory diagrams showing a setting example of the ultraviolet lamp of this inkjet printer.
Figure 11:
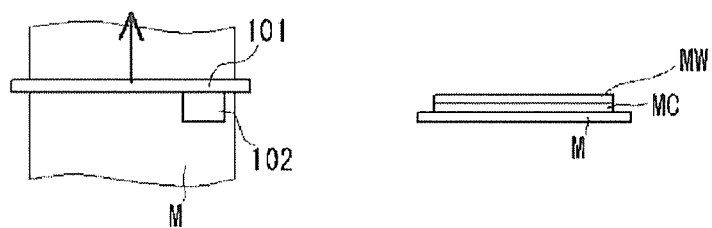

FIG. 11A to FIG. 11C show a setting example of the ultraviolet lamps in the case of forming other printing layers. Specifically, by the setting of the LED modules 1 shown in FIG. 11A, the color layer MC and a white layer MW are formed on the medium M as shown in FIG. 11C. The medium M is fed in the forward direction with respect to the carriage 102. In this case, the LED modules 1 are moved and fixed in the rails 2, positioned at the position B, the position C, and the position D in the inner rows In, and positioned at the position BC in the outer rows Ou. Of the ink heads, two of them at an upper part and center on the left side in the drawing are M (Magenta) and C (Cyan), and two of them at an upper part and center on the right side are Y (Yellow) and K (Black). The two of them on a lower side are W (White).

In the case of the above positions, the position B1, the position C2, and the position D become the pinning sections, and the position BC becomes the curing section. The output of the pinning sections is "50", and the output of the curing section is "150".

Figures 12A, 12B, 12C:
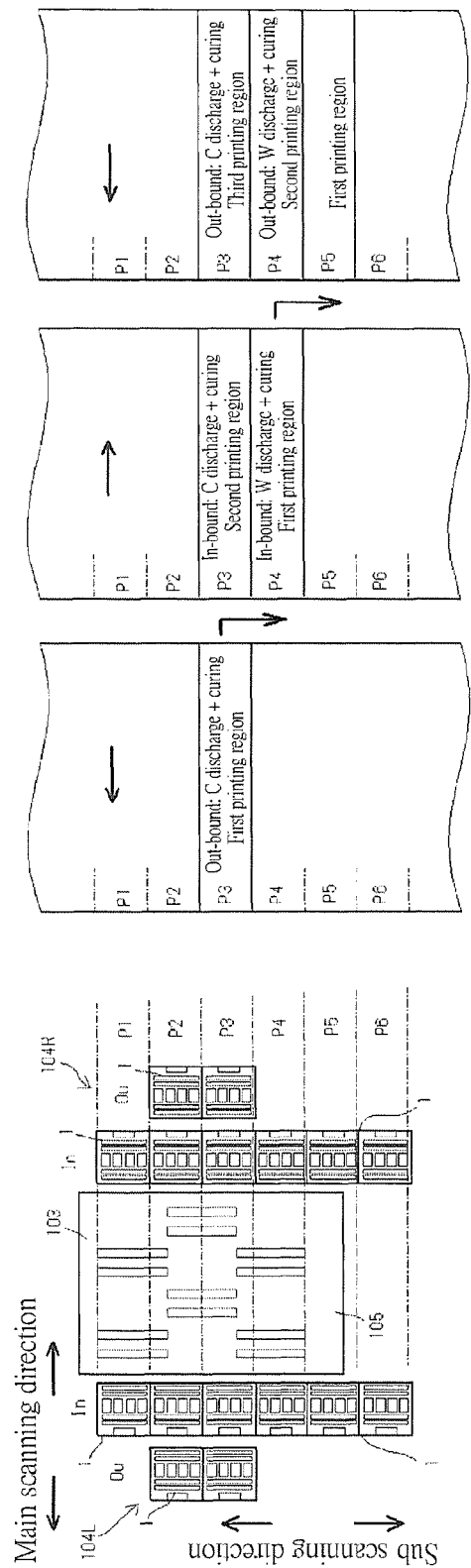
FIG. 12A to FIG. 12C are explanatory diagrams showing an example of the operation of this inkjet printer.

As shown in FIG. 12A, during the out-bound, the color ink is discharged from the printer head 105 over the print width P1 onto the medium M, and ultraviolet ray is delivered at the output "150" by the curing section of the LED modules 1 at the position C1, and the color layer MC is completely cured (first printing region).

Next, as shown in FIG. 12B, during the in-bound, the carriage 102 is moved in the forward direction for P1 with respect to the medium M. Due to this, the first printing region moves to the position C2. Then, in this in-bound, white ink that is to be the white layer MW is discharged from the printer head 105 over the print width P2 on the color layer MC in the first printing region. In this in-bound, the white ink in the first printing region is exposed by the strong ultraviolet ray with the output of "150" by the curing section, and is completely cured. Further, in the in-bound, the color ink is discharged from the printer head 105 over the print width P1 onto the medium M and ultraviolet ray is delivered with the output of "150" by the curing section of the LED modules 1 at the position C1 (second printing region), and the color layer MC is completely cured thereby.

Next, as shown in FIG. 12C, during the out-bound, the medium M is moved in the forward direction by one print width with respect to the carriage 102, and the white ink that is to be the white layer MW is discharged from the printer head 105 over the print width P2 onto the color layer MC in the second printing region. In this in-bound, the white ink in the second printing region is exposed by the strong ultraviolet ray with the output of "150" by the curing section, and is completely cured. Further, in the out-bound, the color ink is discharged from the printer head 105 over the print width P1 onto the medium M and ultraviolet ray is delivered with the output of "150" by the curing section of the LED modules 1 at the position C1 (third printing region), and the color layer MC is completely cured thereby. Further, curing is performed by the LED modules 1 at the position D1 onto the white layer MW in the first printing region.

The curing of the white layer MW is performed also at the position D2. Further, this procedure is repeated to continue printing.

As above, in the case of forming the white layer MW on the color layer MC, the white layer MW needs to be formed after having completely cured the color layer MC so that the color layer MC does not permeate to the white layer MW and smear thereon. Due to this, in the above arrangement, the discharged color ink is exposed to the strong ultraviolet ray by the LED modules 1 in the inner rows In and the outer rows Ou at the position C1 to completely be cured, the white ink is discharged thereon and exposed by the LED modules 1 in the position C2 to completely be cured. Due to this, high quality printing can be performed continuously.

Figure 13:
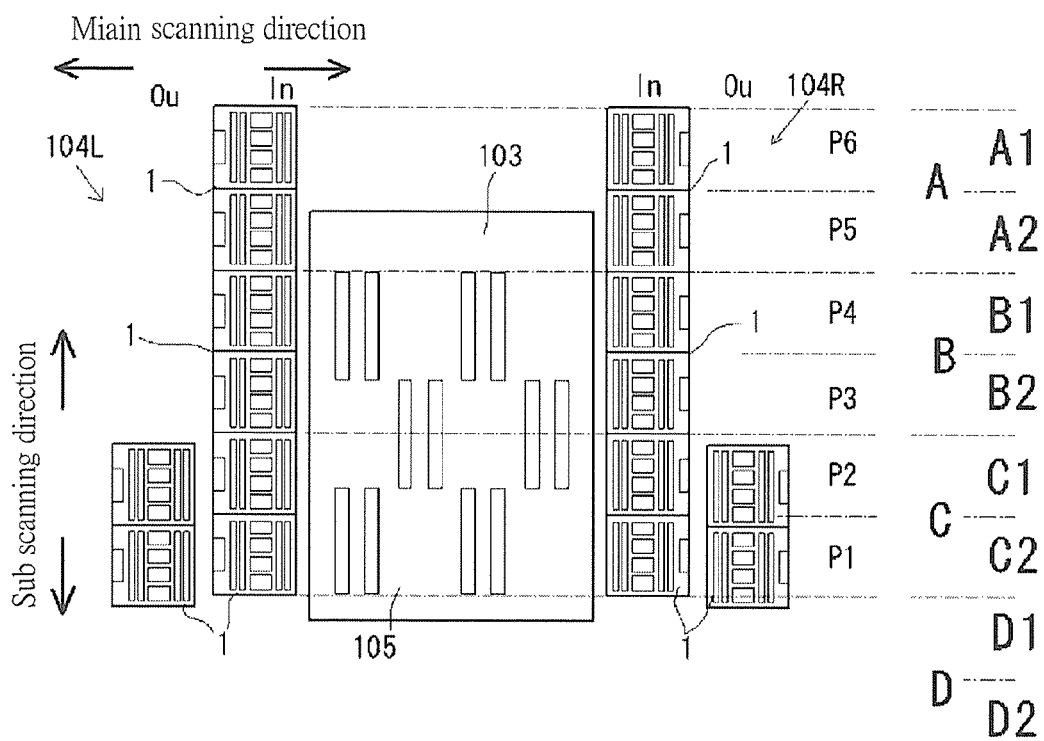
FIG. 13A to FIG. 13C are explanatory diagrams showing a setting example of the ultraviolet lamp of this inkjet printer.
Figure 13:
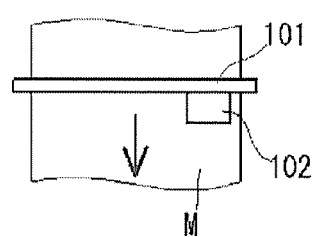
Figure 13:
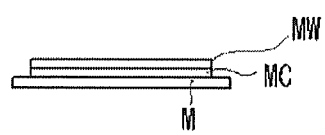

FIG. 13A to FIG. 13C show another setting example of the ultraviolet lamps 104 in the case of forming the color layer MC and the white layer MW. Specifically, the white layer MW and the color layer MC are formed on the medium M as shown in FIG. 13C by the setting of the LED modules 1 shown in FIG. 13A.

In this setting example, as shown in FIG. 13B, the relative movement direction of the medium M with respect to the carriage 102 becomes the upward direction in the drawing (reverse direction).

In this case, the LED modules 1 are moved and fixed in the rails 2, positioned at the position A, the position B, and the position C in the inner rows In. In the outer rows Ou, the LED modules 1 are positioned at the position C. Of the ink heads, two of them at an upper part and center on the left side in the drawing are M (Magenta) and C (Cyan), and two of them at an upper part and center on the right side are Y (Yellow) and K (Black). The two of them on a lower side are W (White).

In the case of the above positions, the position A and the position B become the pinning sections, and the position C becomes the curing section. The pinning sections have the output of the LED modules 1 in the inner rows In at the position C as "100" and the output of the LED modules 1 in the outer rows Ou at the position C is "50", so the output of the position C becomes "150".

Figures 14B, 14C:
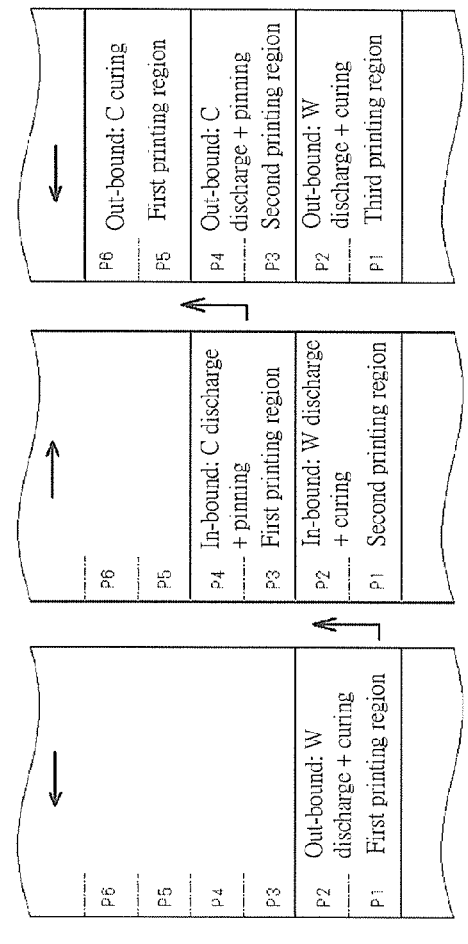
FIG. 14A to FIG. 14C are explanatory diagrams showing an example of the operation of this inkjet printer.
Figure 14A:
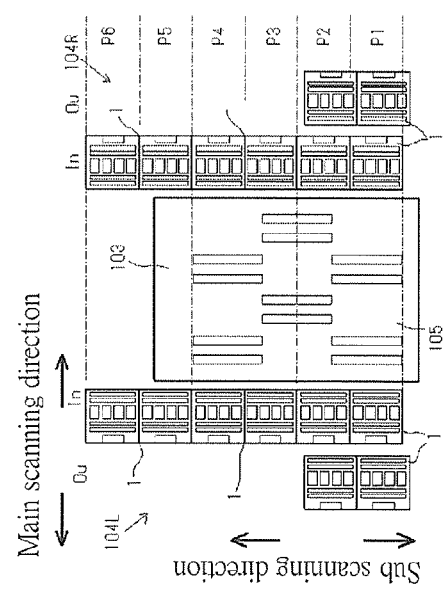

As shown in FIG. 14A, during the out-bound, the white ink is discharged from the printer head 105 over the print widths P1, P2 onto the medium M, and strong ultraviolet ray is delivered at the output "150" by the curing section of the LED modules 1 at the position C, and the white layer MC is completely cured (first printing region).

Next, as shown in FIG. 14B, the medium M is moved in the reverse direction with respect to the carriage 102. Specifically, it is moved by one position. Then, during the in-bound, the color ink that is to be the color layer MC is discharged from the printer head 105 over the print widths P3, P4 on the white layer MW in the first printing region. The color ink is exposed by the output "50" by the pinning section in the position B. Further, during the in-bound, the white ink is discharged from the printer head 105 over the print widths P1, P2 onto the medium M, and ultraviolet ray is delivered with the output "150" by the curing section of the LED modules 1 in the position C (second printing region), and the white layer MW is cured completely.

In the subsequent out-bound, as shown in FIG. 14C, the medium M is relatively moved in the reverse direction with respect to the carriage 102. Specifically, it is moved by one position. Then, in the out-bound, ultraviolet ray is delivered at the output "100" by the LED modules 1 at the position A onto the color layer MC in the first printing region, and the color layer MC is completely cured. By completely curing the color layer MC after a certain period of time has elapsed since the exposure by the pinning sections, the permeation of the ink into the medium M can be enhanced.

Further, the color ink that is to be the color layer MC is discharged from the printer head 105 over the print widths P3, P4 on the white layer MW in the second printing region. The color ink is exposed by the output "50" by the pinning section in the position B. Further, during the out-bound, the white ink is discharged from the printer head 105 over the print widths P1, P2 onto the medium M, and ultraviolet ray is delivered with the output "150" by the curing section of the LED modules 1 in the position C (third printing region), and the white layer MW is cured completely. Further, this procedure is repeated to continue printing.

In the arrangement shown in FIG. 14A to FIG. 14C, the color layer MC is formed with the white layer MW as the base therefor, so the white ink is completely cured by the strong ultraviolet ray at position C so that the color ink will not smear in the white layer MW. Then, the ink is spread by discharging the color ink at position B and pinning therein, and the color ink is cured at the position A, and finally a smooth print surface is obtained.

[Formation of Color Layer MC, White Layer MW and Clear Layer MCL]

FIG. 15A to FIG. 15C show a setting example of the ultraviolet lamps 104 in the case of forming another print layer. Specifically, by the setting of the LED modules 1 shown in FIG. 15A, the white layer MW, the color layer MC, and a clear layer MCL are formed on the medium M as shown in FIG. 15C. In this setting example of the ultraviolet lamps 104, as shown in FIG. 15B, the relative movement direction of the medium M with respect to the carriage 102 is the forward direction.

In this case, the LED modules 1 are moved and fixed in the rails 2, positioned at the position B, the position C, and the position D in the inner rows In. In the outer rows Ou, the LED modules 1 are positioned at the position BC (position including the color ink head). Of the ink heads in the drawing, three of them on the left side are M (Magenta), C (Cyan), Y (Yellow) and K (Black), and three of them on the right side are W (White) and CL (Clear). In the case of the above arrangement of the LED modules 1, the positions B, D become the pinning sections, and the position C becomes the curing section. Further, for the sake of explanation, the print widths and the positions are denoted by the same reference signs P1 to P5 only for the FIG. 15A to FIG. 15C, and FIG. 16A to FIG. 16E.

As shown in FIG. 16A, during the out-bound, the white ink is discharged from the printer head 105 over the print width P1 onto the medium M, and ultraviolet ray is delivered with the output "100" by the curing section of the LED modules 1 at the position P1, and complete curing is performed (first printing region).

Next, as shown in FIG. 16B, during the in-bound, the carriage 102 is moved in the forward direction for one print width with respect to the medium M. Due to this, the first printing region moves to the position P2. In this in-bound, color ink that is to be the color layer MC is discharged over the print width P2 on the white layer MW in the first printing region, ultraviolet ray is delivered with the output "150" by the curing section, and complete curing is performed. Further in the in-bound, the white ink is discharged from the printer head 105 over the print width P1 onto the medium M (second printing region) and ultraviolet ray is delivered with the output of "100" by the curing section configured of the LED modules 1, and complete curing is performed.

Next, as shown in FIG. 16C, during the out-bound, the carriage 102 is moved in the forward direction by one print width with respect to the medium M. Due to this, the first printing region moves to the position P3. Firstly, in the out-bound, clear ink that is to be the clear layer MCL is discharged from the printer head 105 over the print width P3 on the color layer MC in the first printing region. At this occasion, ultraviolet ray is not delivered immediately onto the clear ink, but instead the ultraviolet ray is delivered after a predetermined time. Further, in the out-bound, the color ink that is to be the color layer MC is discharged over the print width P2 on the white layer MW in the first printing region, ultraviolet ray is delivered with the output of "150" by the curing section, and complete curing is performed. Further, the white ink is discharged onto the medium M from the printer head 105 over the print width P1 (third printing region), ultraviolet ray is delivered with the output of "100" by the curing section configured of the LED modules 1 in the position B2, and complete curing is performed.

Next, as shown in FIG. 16D, during the in-bound, the carriage 102 is relatively moved in the forward direction by one print width with respect to the medium M. Due to this, the first printing region moves to the position P4. In the in-bound, the ultraviolet ray is not delivered to the clear layer MCL. Further, clear ink that is to be the clear layer MCL is discharged from the printer head 105 over the print width P4 on the color layer MC in the second printing region. At this occasion, ultraviolet ray is not delivered immediately onto the clear ink, but instead the ultraviolet ray is delivered after a predetermined time. Further, the color ink that is to be the color layer MC is discharged over the print width P2 on the white layer MW in the third printing region, ultraviolet ray is delivered with the output of "150" by the curing section, and complete curing is performed. Further, the white ink is discharged onto the medium M from the printer head 105 over the print width P1 (fourth printing region), ultraviolet ray is delivered with the output of "100" by the curing section, and complete curing is performed.

Next, as shown in FIG. 16E, during the out-bound, the carriage 102 is moved in the forward direction by one print width with respect to the medium M. Due to this, the first printing region moves to the position P5. In the in-bound, ultraviolet ray is delivered with the output of "25" on the clear layer MCL. Due to this, the clear layer MCL is completely cured. Next, in the out-bound, ultraviolet ray is not delivered to the clear layer MCL in the second printing region. Further, clear ink that is to be the clear layer MCL is discharged from the printer head 105 over the print width P3 on the color layer MC in the third printing region. At this occasion, ultraviolet ray is not delivered immediately onto the clear ink, but instead the ultraviolet ray is delivered after a predetermined time. Further, the color ink that is to be the color layer MC is discharged from the print over P2 on the white layer MW in the fourth printing region, ultraviolet ray is delivered with the output of "150" by the curing section, and complete curing is performed. Further, the white ink is discharged onto the medium M from the printer head 105 over the print width P1 (fifth printing region), ultraviolet ray is delivered with the output of "100" by the curing section configured of the LED modules 1 in the position B2, and complete curing is performed.

Further, the above procedure is repeated to form the white layer MW, the color layer MC, and the clear layer MCL on the medium M. It should be noted that although not shown, in case of printing in the reverse direction, printing is performed by the operation similar to the above with the isled module 1 arranged to be inverted in the sub scanning direction (depiction is omitted).

According to such an arrangement, by arranging the LED modules 1 in the outer rows Ou, the quantity of light that cures the color ink can be obtained at the position C1. Further, the clear ink can be spread sufficiently on a surface of the color layer MC by performing the curing after a predetermined time since the clear ink has been discharged, so that the smooth surface can be obtained.

Configuration Example 1 of Ultraviolet Lamp

FIG. 17A to FIG. 17E are explanatory diagrams showing another configuration example of the ultraviolet lamps. The ultraviolet lamps 104 have a configuration of providing two LED modules 1 on each inner row In and two LED modules 1 on each outer row Ou, which are respectively separated and movable. In case of manually moving the LED modules 1 along the rails 2, the LED modules 1 can be separated from each other. In case of driving the LED modules 1 by a motor, a set of a small-sized step motor, a pulley and a belt is required for each of the separated LED modules 1.

The arrangement shown in FIG. 17A achieves substantially the same effect as the arrangement shown in FIG. 7A to FIG. 7C. That is, the high output LED modules 1 that were on the inner rows In in the position B are configured to be moved to the outer rows Ou. The arrangement shown in FIG. 17B inverts the arrangement shown in FIG. 17A in the sub scanning direction, and it is the case of moving the medium M in the reverse direction. This arrangement achieves substantially the same effect as the arrangement shown in FIG. 9A to FIG. 9C.

The arrangement shown in FIG. 17C achieves substantially the same effect as the arrangement shown in FIG. 11A to FIG. 11C. That is, the high output LED modules 1 that were on the inner rows In in the position D are configured to be moved to the outer rows Ou. Further, the arrangement shown in FIG. 17D achieves substantially the same effect as the arrangement shown in FIG. 13A to FIG. 13C. That is, the high output LED modules 1 that were on the inner rows In in the position A are configured to be moved to the outer rows Ou. The arrangement shown in FIG. 17E achieves substantially the same effect as the arrangement shown in FIG. 15A to FIG. 15C. That is, the high output LED modules 1 that were on the inner rows In in the position D are configured to be moved to the outer rows Ou.

The operation of the ultraviolet lamps 104 shown in FIG. 17A to FIG. 17E is same as those shown in FIG. 8A to FIG. 8C, FIG. 10A to FIG. 10C, FIG. 12A to FIG. 12C, FIG. 14A to FIG. 14C, and FIG. 16A to FIG. 16E, however, since the LED modules 1 on the inner rows In are arranged on the outer rows Ou, a slight time difference is generated in the time from the ink discharge to the ultraviolet ray irradiation. Due to this, since the ink spreading time is elongated compared to the cases shown in FIG. 8A to FIG. 8C and the like, soft printing becomes possible even with the same moving speed of the carriage 102 in the main scanning direction.

Figure 18:
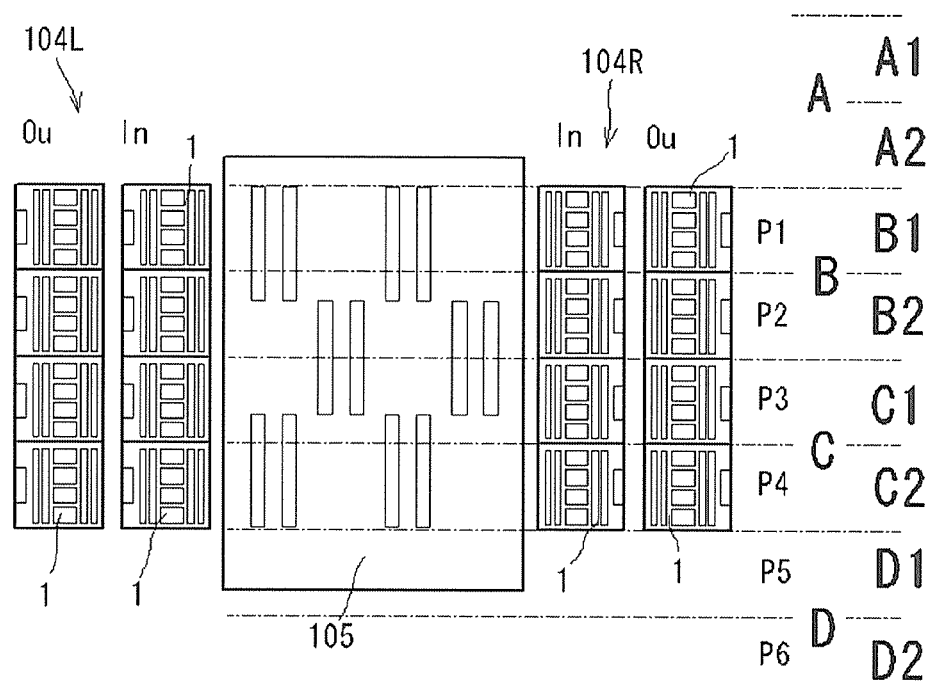
FIG. 18 is an explanatory diagram showing a characteristic arrangement example in case of using two LED modules 1 on an inner row In, and two LED modules 1 on an outer row Ou.

FIG. 18 is an explanatory diagram showing a characteristic arrangement example in the case of providing two LED modules 1 on each inner row In and two LED modules 1 on each outer row Ou. In this arrangement, the LED modules 1 on the inner rows In are positioned at the position B and the position C, and the LED modules 1 on the outer rows Ou are also positioned at the position B and the position C.

As shown in FIG. 18, in case of providing two LED modules 1 on each inner row In and two LED modules 1 on each outer row Ou and configuring them to be movable in the sub scanning direction, the output range of the ultraviolet ray at the position B and the position C becomes "1" to "200". When the output range is widened, ink requiring high ultraviolet output for curing can be used in a wide printing area. Further, although not shown, all of the inner rows In and outer rows Ou may each provide two LED modules 1 at the position A and the position B, or at the position C and the position D.

Configuration Example 2 of Ultraviolet Lamp

Figure 19:
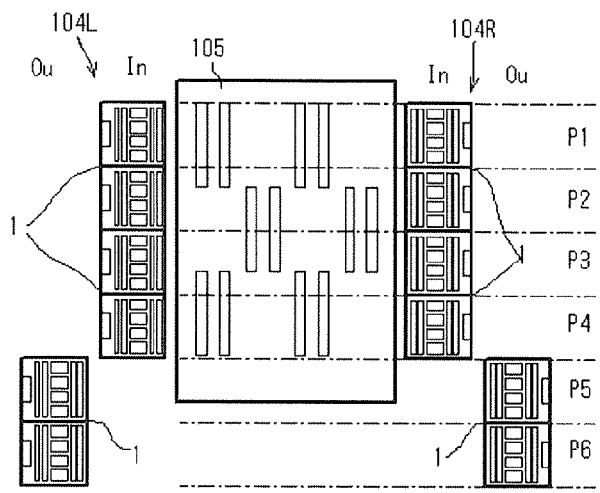
FIG. 19A to FIG. 19C are explanatory diagrams showing another configuration example of the ultraviolet lamp.
Figure 19:
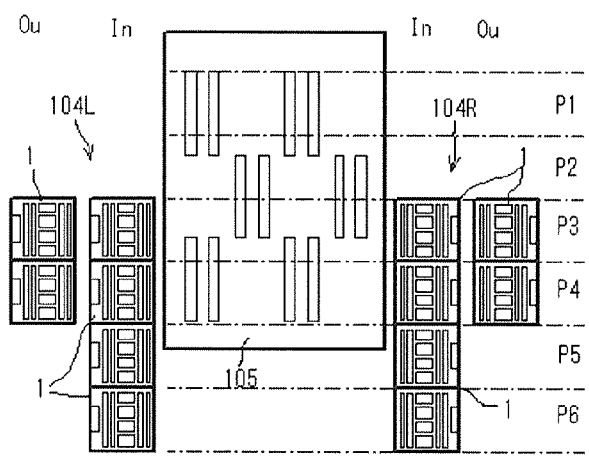
Figure 19:
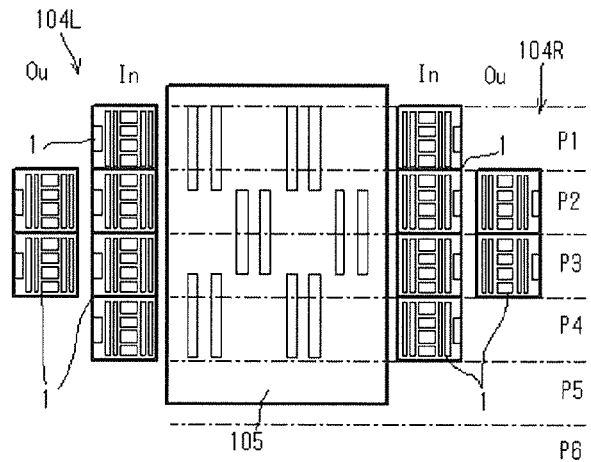

FIG. 19A to FIG. 19C are explanatory diagrams showing another configuration example of the ultraviolet lamps. The ultraviolet lamps 104 have a configuration of providing two LED modules 1 on each inner row In and one LED module 1 on each outer row Ou. These can move along the rails 2 provided in the inner rows In and the outer rows Ou.

The configuration of FIG. 19A arranges the LED modules 1 at the position C and the position D on the inner rows In, and arranges one LED module 1 at the position D on each outer row Ou. In this case, in the position B, the position C, and the position D, the output range becomes "1" to "100", and uniformity as a whole is obtained.

The configuration of FIG. 19B arranges one LED module 1 at the position C and the position D on each inner row In, and arranges one LED module 1 at the position C on each outer row Ou. In this case, in the position C, the output range of the ultraviolet ray becomes "1" to "200". Since the output range of the ultraviolet ray at the position D is "1" to "100", thus, in this configuration as well, the quantities of light different for each position can be obtained by moving the LED modules 1 along the rails 2. It should be noted that since the distance between the printer head 105 and the LED modules 1 is large, time from the ink discharge to the ultraviolet ray irradiation becomes longer. Due to this, soft processing is performed, in which the printed surface is somewhat smeared.

The configuration of FIG. 19C arranges one LED module 1 at the position B and the position C on each inner row In, and arranges one LED module 1 at the position BC on each outer row Ou. With such a configuration, in the position BC, the output range of the ultraviolet ray becomes "1" to "200". Since the output range of the ultraviolet ray at the position B1 and the position C2 is "1" to "100", thus, in this configuration as well, the quantities of light different for each position can be obtained by moving the LED modules 1 along the rails 2.

Configuration Example 3 of Ultraviolet Lamp

Figure 20:
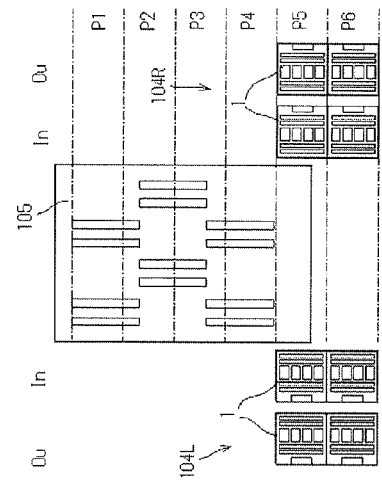
FIG. 20A to FIG. 20D are explanatory diagrams showing another configuration example of the ultraviolet lamp.
Figure 20:
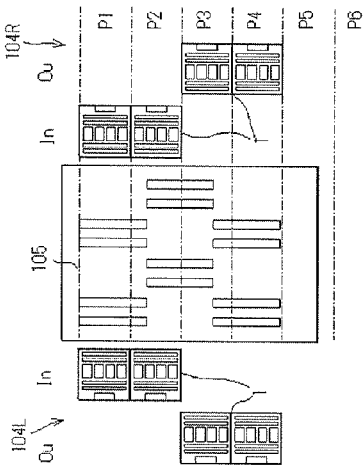
Figure 20:
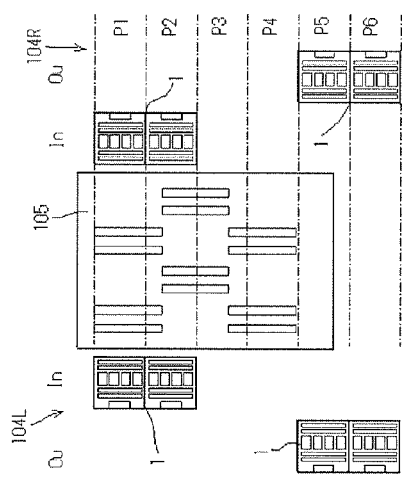
Figure 20:
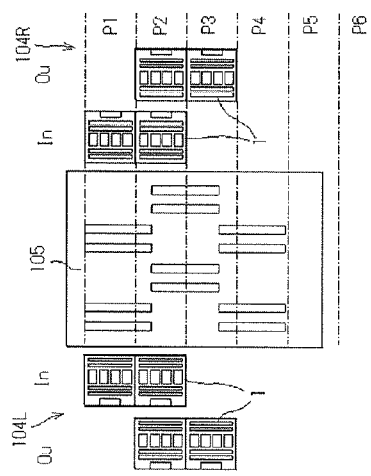

FIG. 20A to FIG. 20D are explanatory diagrams showing another configuration example of the ultraviolet lamps. The ultraviolet lamps 104 have a configuration of providing one LED module 1 on each inner row In and one LED module 1 on each outer row Ou. These can move along the rails 2 provided in the inner rows In and the outer rows Ou. In FIG. 20A, the LED modules 1 of the inner rows In are arranged at the position B, and the LED modules 1 of the outer rows Ou are arranged at the position D.

Further, as shown in FIG. 20B, by arranging the LED modules 1 in the position D in the outer rows Ou and the inner rows In, the output range of the ultraviolet ray at the position D becomes "1" to "200". As above, even with just one LED module 1 on each of the inner rows In and the outer rows, the output range can be made large. Further, for example, the output at the position D1 can be "200" while the output at the position D2 can be "50", by which the quantities of light different for each position can be obtained.

Further, as shown in FIG. 20C, by arranging the LED modules 1 in the inner rows In at the position B and the LED modules 1 in the outer rows Ou at the position BC, the output range of the ultraviolet ray at the position B2 becomes "1" to "200". Since the output range of the ultraviolet ray at the position B1 and the position C2 is "1" to "100", thus, in this configuration as well, the quantities of light different for each position can be obtained by moving the LED modules 1 along the rails 2. It should be noted that in FIG. 20A to FIG. 20C, since the distance between the printer head 105 and the LED modules 1 is large, time from the ink discharge to the ultraviolet ray irradiation becomes longer. Due to this, soft processing is performed, in which the printed surface is somewhat smeared.

As shown in FIG. 20D, by arranging the LED modules 1 at the position B in the inner rows In and at the position C in the outer rows Ou, the output range at the positions B, C can be "1" to "100".

As above, even with one LED module 1 on each of the inner rows In and the outer rows, a wide variety of output range can be obtained at the needed position. Further, the quantities of light different for each position can be obtained.

Configuration Example 4 of Ultraviolet Lamp

FIG. 21A to FIG. 21D are explanatory diagrams showing another configuration example of the ultraviolet lamps. The ultraviolet lamps 104 have a configuration of providing two LED modules 1 on each inner row In, one LED module 1 on each intermediate row, and one LED module 1 on each outer row Ou. These LED modules 1 can move along the rails 2 provided beside the holder 103.

Figure 21A:
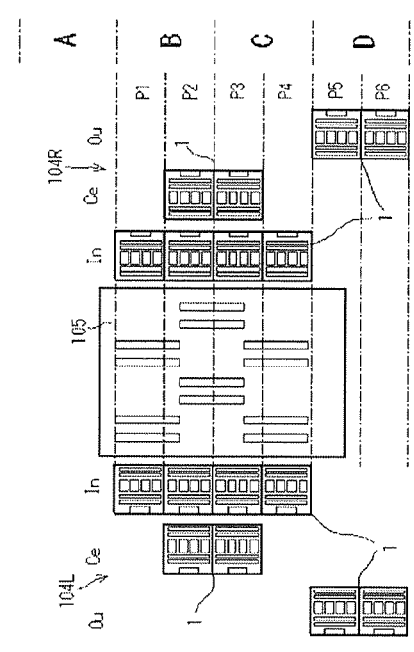
FIG. 21A to FIG. 21D are explanatory diagrams showing another configuration example of the ultraviolet lamp.

According to FIG. 21A, the LED modules 1 are arranged at the position B and the position C on the inner rows In, the LED modules 1 are arranged at the position D on the intermediate rows, and the LED modules 1 are arranged at the position D also on the outer rows Ou. This arrangement achieves substantially the same effect as the arrangement shown in FIG. 7A to FIG. 7C. That is, the LED modules 1 that were on the inner rows In in the position D are arranged in the intermediate rows.

Figure 21B:
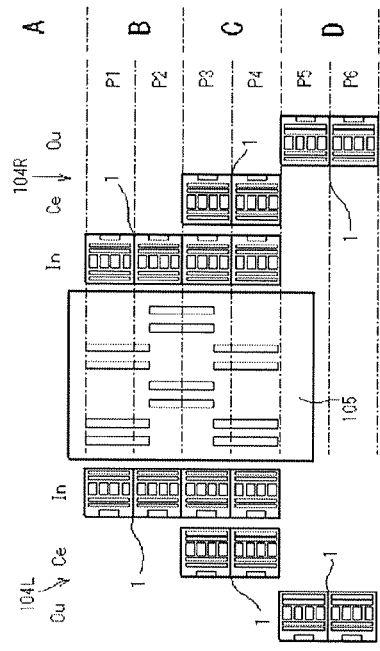
Figure 21C:
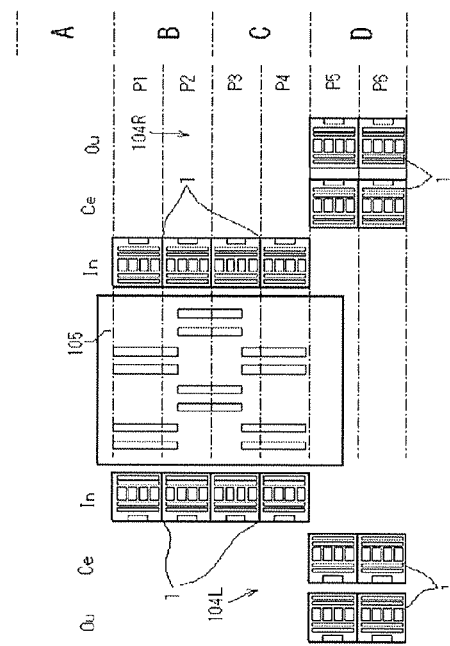
Figure 21D:
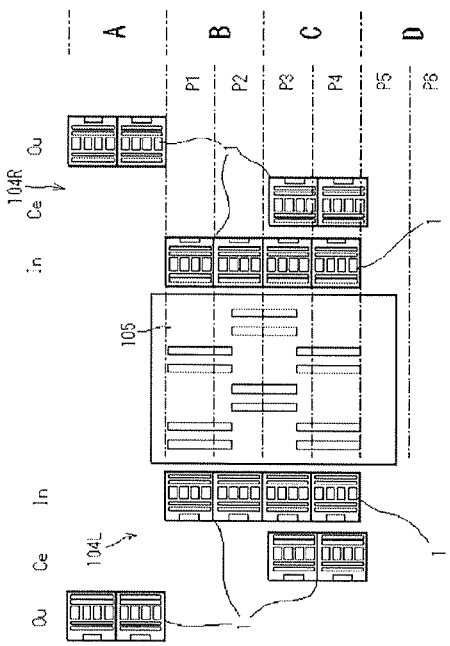

The arrangement of FIG. 21B achieves substantially the same effect as the arrangement shown in FIG. 11A to FIG. 11C. That is, the LED modules 1 that were on the inner rows In in the position D are moved to the outer rows Ou. The arrangement of FIG. 21C achieves substantially the same effect as the arrangement shown in FIG. 13A to FIG. 13C. That is, the LED modules 1 that were on the inner rows In in the position A are moved to the outer rows Ou. The arrangement of FIG. 21D achieves substantially the same effect as the arrangement shown in FIG. 15A to FIG. 15C. That is, the high output LED modules 1 that were on the inner rows In in the position D are moved to the outer rows Ou.

The operation of the ultraviolet lamps 104 shown in FIG. 21A to FIG. 21D is same as those shown in FIG. 8A to FIG. 8C, FIG. 12A to FIG. 12C, FIG. 14A to FIG. 14C, and FIG. 16A to FIG. 16E, however, since the LED modules 1 on the inner rows In are arranged on the intermediate rows Ce, and the outer rows Ou are arranged away from the inner rows In, a slight time difference is generated in the time from the ink discharge to the ultraviolet ray irradiation. Due to this, since the ink spreading time is elongated compared to the cases shown in FIG. 8A to FIG. 8C and the like, soft printing becomes possible even with the same moving speed of the carriage 102 in the main scanning direction.

FIG. 22A and FIG. 22B are explanatory diagrams showing a characteristic arrangement example in case of providing two LED modules 1 on each inner row In, one LED module 1 on each intermediate row, and one LED module 1 on each outer row Ou. The LED modules 1 of the inner rows In are positioned at the position B and the position C, the LED modules 1 of the intermediate rows are positioned at the position B, and the LED modules 1 of the outer row Ou are positioned at the position B also. In case of this arrangement, the output range of the ultraviolet ray at the position B becomes "1" to "300". The output range of the ultraviolet ray at the position C becomes "1" to "100". As above, according to this arrangement, compared to the arrangement of the LED modules 1 shown in FIG. 7A to FIG. 7C, the output range of the ultraviolet ray can be widened to "1" to "300" with the same number of LED modules 1. Further, the quantities of light different for each position can be obtained.

Figure 22:
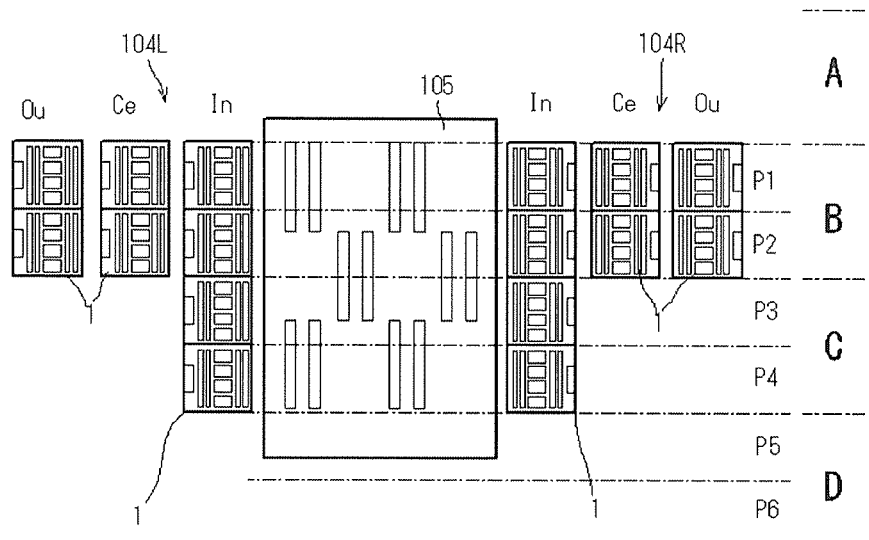
FIG. 22A and FIG. 22B are explanatory diagrams showing a characteristic arrangement example in case of using two LED modules 1 on the inner row In, one LED module 1 on an intermediate row, and one LED module 1 on the outer row Ou.
Figure 22:
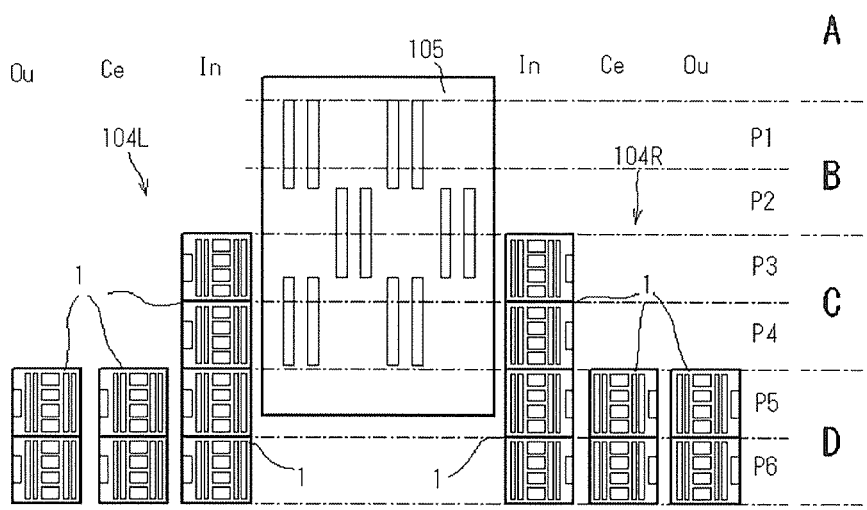

It should be noted that in the configurations of FIG. 21A to FIG. 21D and FIG. 22 A and FIG. 22B, the position of the LED modules 1 in the inner rows In may be fixed. Further, in FIG. 22B, since the distance between the printer head 105 and the LED modules 1 is large, time from the ink discharge to the ultraviolet ray irradiation becomes longer. Due to this, soft processing is performed, in which the printed surface is somewhat smeared.

Configuration Example 5 of Ultraviolet Lamp

FIG. 23A to FIG. 23D are explanatory diagrams showing another configuration example of the ultraviolet lamps. The ultraviolet lamps 104 have a configuration of providing three LED modules 1 on each inner row In, one LED module 1 on each intermediate row, and one LED module 1 on each outer row Ou. These LED modules 1 can move along the rails 2 provided beside the holder 103.

According to FIG. 23A, the LED modules 1 are arranged at the position B, the position C, and the position D on the inner rows In, the LED modules 1 are arranged at the position D on the intermediate rows, and the LED modules 1 are arranged at the position D also on the outer rows Ou. According to this arrangement, in the position D, the output range becomes "1" to "300", and an extremely wide output range can be obtained by the small number of LED modules 1. Further, the quantities of light different for each position can be obtained.

Figure 23:
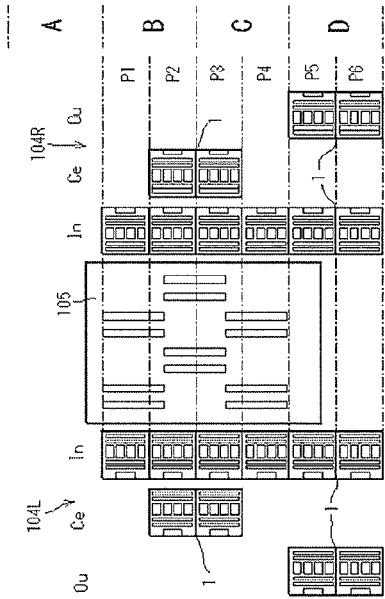
FIG. 23A to FIG. 23D are explanatory diagrams showing another configuration example of the ultraviolet lamp.
Figure 23:
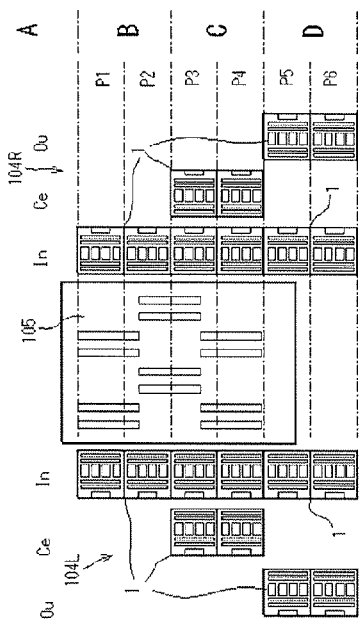
Figure 23:
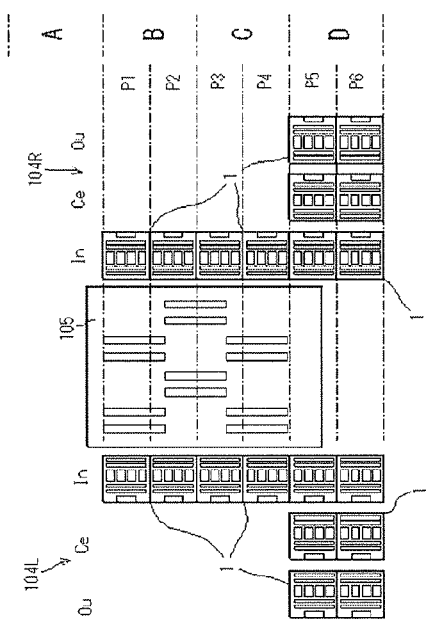
Figure 23:
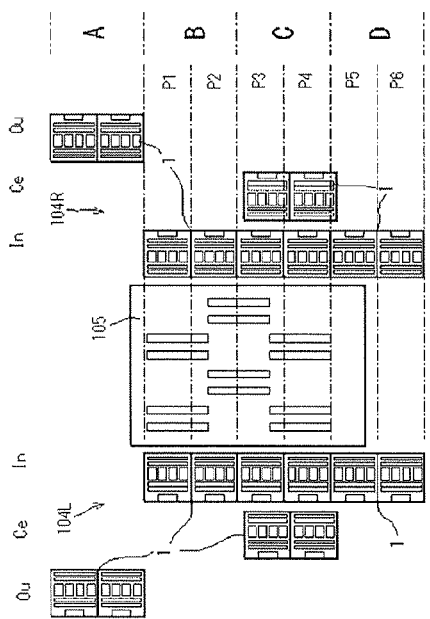

The wide output range "1" to "200" can be obtained at a specific position also by the arrangement configurations of FIG. 23B to FIG. 23D, and in FIG. 23 B and FIG. 23D, the output range "1" to "200" can be obtained over two positions. Further, according to the arrangements in FIG. 23B to FIG. 23D, the quantities of light different for each position can be obtained. Further, since there is a distance from the LED modules 1 on the outer rows Ou to the printer head 105, predetermined time difference is generated in the time from the ink discharge to the exposure. Due to this, it is preferably used for obtaining glossy property.

Configuration Example 6 of Ultraviolet Lamp

Figure 24:
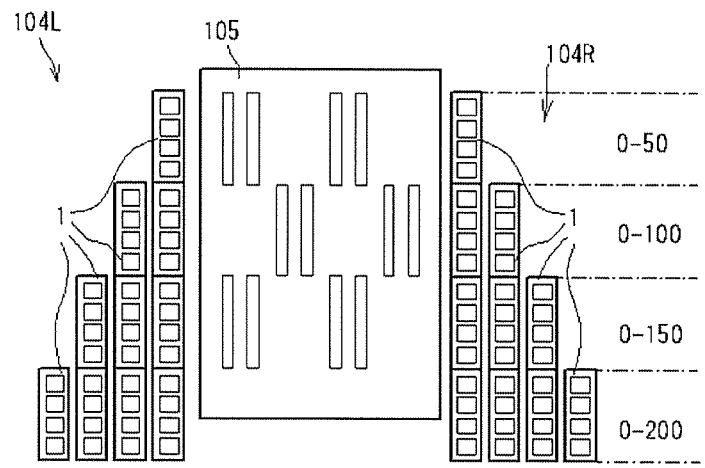
FIG. 24A and FIG. 24B are explanatory diagrams showing another configuration example of the ultraviolet lamp.
Figure 24:
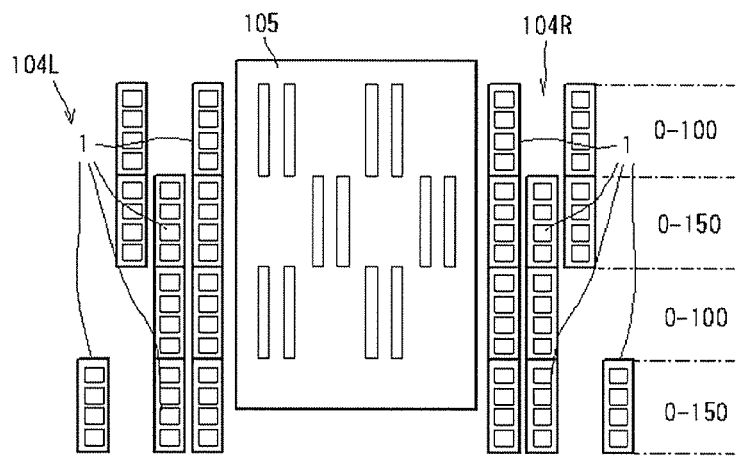

FIG. 24A and FIG. 24B are explanatory diagrams showing another configuration example of the ultraviolet lamps. As the LED modules 1 configuring the ultraviolet lamps 104, those with an elongate shape in which the LED light sources 11 are arranged in one row will be used. Each LED module 1 can move along the rails 2 provided beside the holder 103 manually or by motor drive. Further, the output range of one LED module 1 is "1" to "50".

In the case of FIG. 24A, when a plurality of positions is allotted in the sub scanning direction, the output range of the ultraviolet ray at each position becomes "1" to "50", "1" to "100", "1" to "150", and "1" to "200", from the upper side in the drawing. By moving the LED modules 1 in each row along the rails 2, as shown in FIG. 24B, for example, different output ranges can be set for each position. Further, LED modules 1 in a specific row may be fixed, and inhibited from moving. As above, even if the shape of the LED modules 1 is different from the aforementioned shape, the wider output range of the ultraviolet ray can be obtained by less number of LED modules 1.

Figure 25:
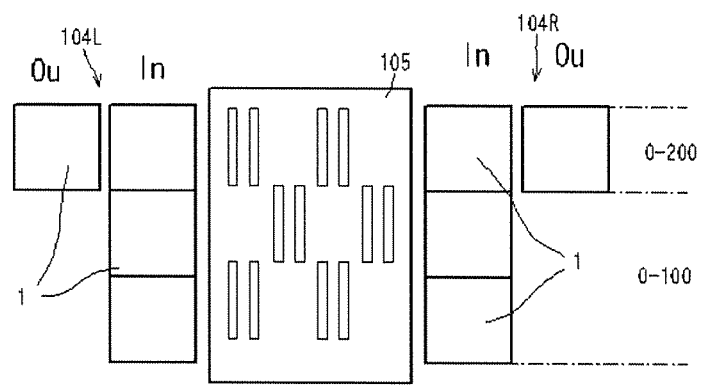
FIG. 25A to FIG. 25C are explanatory diagrams showing another configuration example of the ultraviolet lamp.
Figure 25:
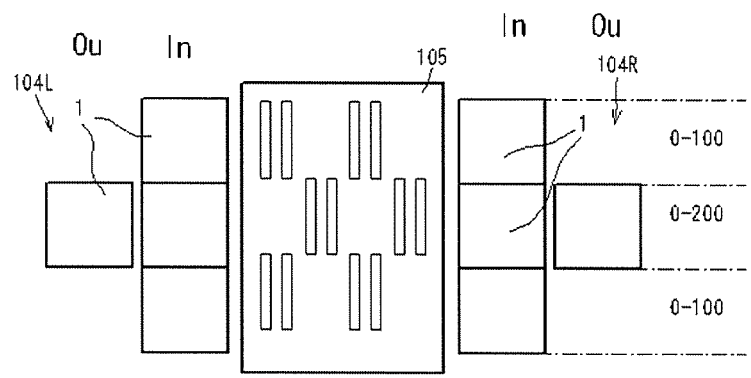
Figure 25:
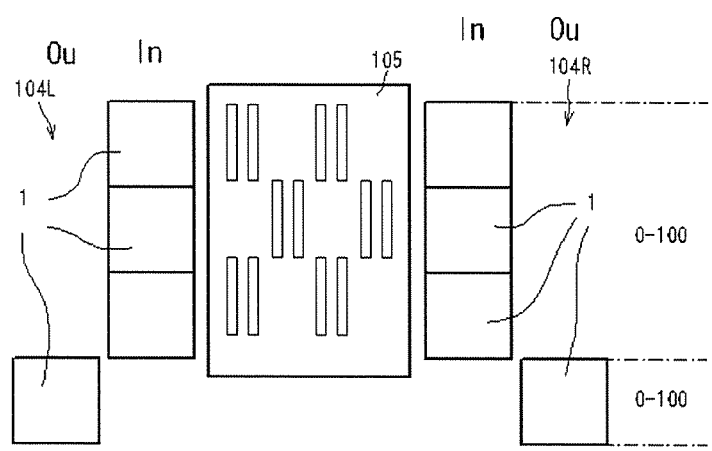

FIG. 25A to FIG. 25C are explanatory diagrams showing another configuration example of the ultraviolet lamps. As the LED modules 1 configuring the ultraviolet lamps 104, square-shaped LED modules 1 are used, and three of them are arranged in each inner row In, and one of them is arranged in each outer row Ou. Each LED module 1 is provided to be movable along the rail 2 provided beside the holder 103. As shown in FIG. 25 A and FIG. 25B, when a plurality of positions is allotted in the sub scanning direction, the output range of the ultraviolet ray at each position becomes "1" to "200", "1" to "100", and "1" to "100", from the upper side in the drawing. As above, the output range of the ultraviolet ray becomes wider at the position where two LED modules 1 are arranged. Further, as shown in FIG. 25C, the LED modules 1 in the inner rows In and the outer rows Ou may be arranged at different positions. In this case, the output range is narrow, however, the irradiation range of the ultraviolet ray is widened.

Embodiment 2

Figure 30:
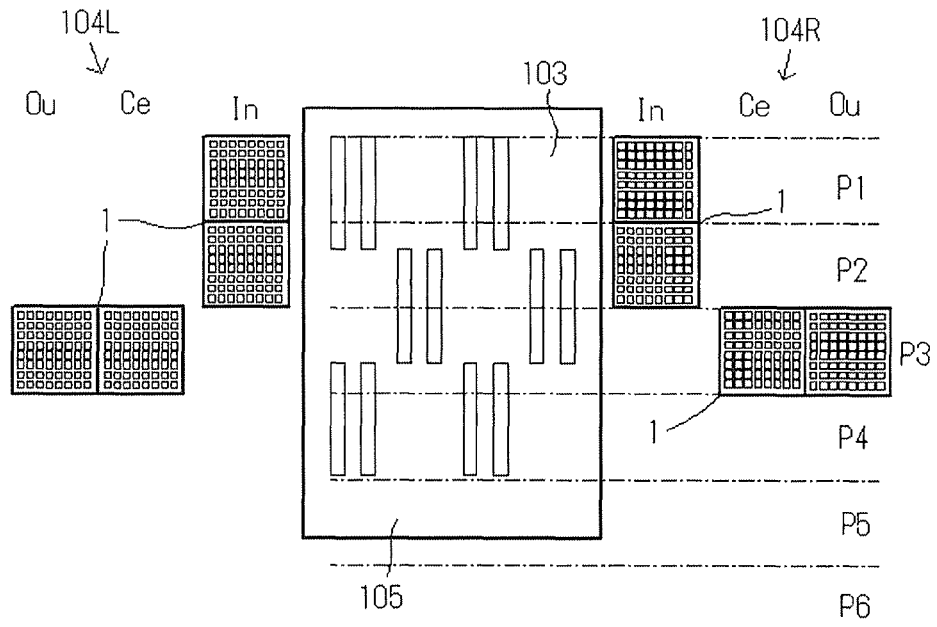
FIG. 30A and FIG. 30B are an explanatory diagrams showing a characteristic arrangement example in case of using one LED module 1 on an inner row In, and one LED module 1 on an outer row Ou.
Figure 30:
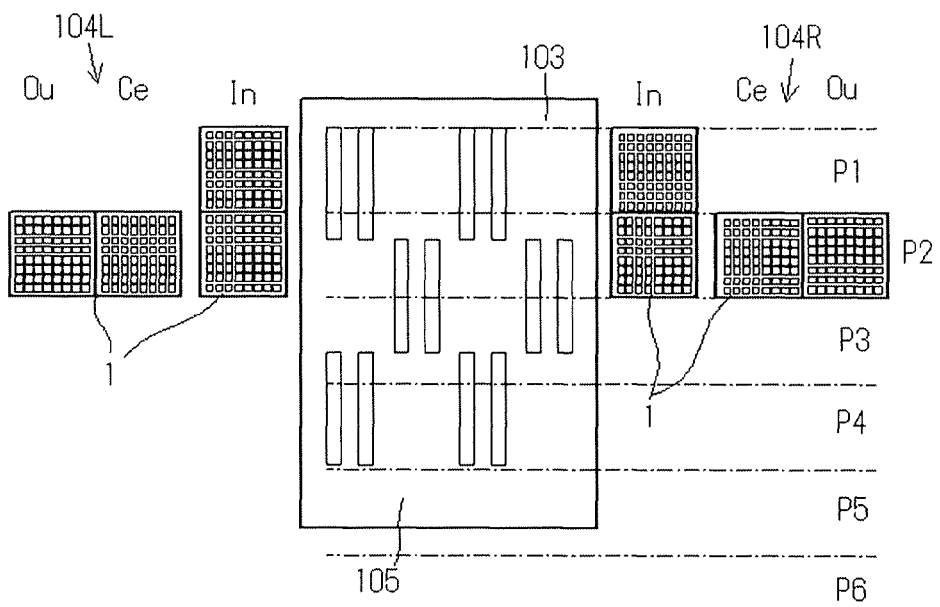

FIG. 26, FIG. 27, FIG. 28, FIG. 29A to FIG. 29 E, FIG. 30 A, and FIG. 30B are explanatory diagrams showing a configuration of ultraviolet lamps of an inkjet printer of an embodiment 2 of the invention. A plurality of LED modules 1 configuring the ultraviolet lamps 104 is supported rotatably with respect to rails 2. The LED modules 1 are same as those rectangular ones shown in FIG. 6. In other words, the LED modules 1 have a shape that is elongated in one direction. A rotation center is positioned at a center of a module member 12 on one side of the LED module 1 having a structure in which two square-shaped module members 12 are connected each other. Specifically, by supporting the LED modules 1 on the inner rows In to be rotatable by 90 degrees, the ultraviolet ray output in the main scanning direction is doubled.

Figure 26:
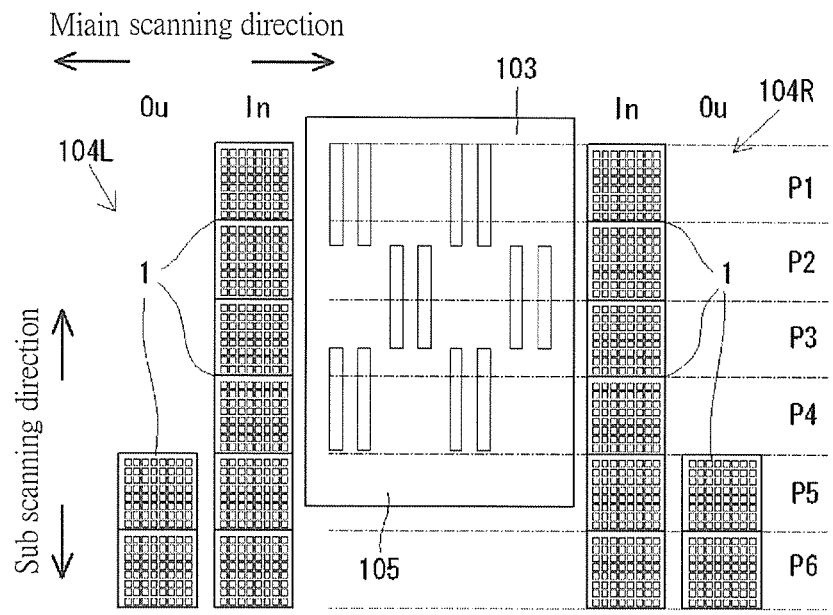
FIG. 26 is an explanatory diagram showing a configuration of an ultraviolet lamp of an inkjet printer according to an embodiment 2 of this invention.
Figure 27:
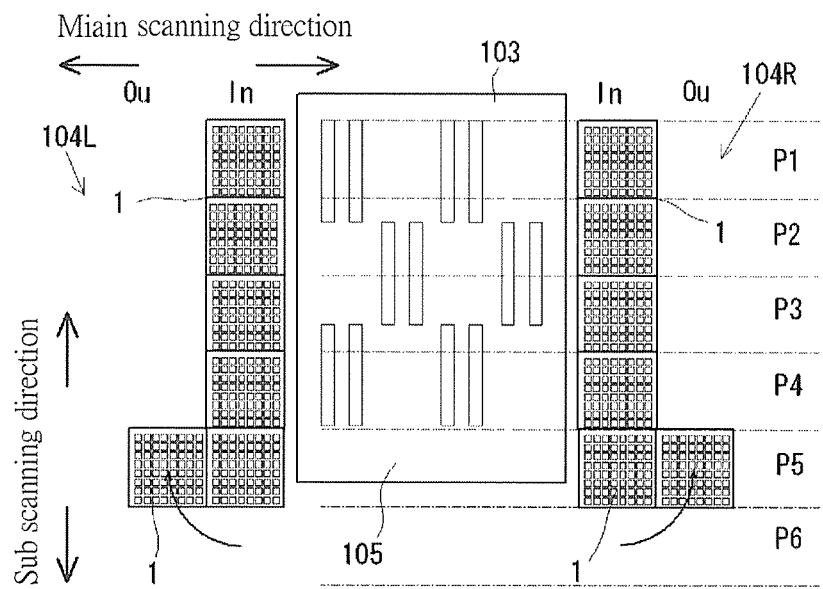
FIG. 27 is an explanatory diagram showing a configuration of the ultraviolet lamp of the inkjet printer of the embodiment 2 of this invention.

FIG. 26 is an explanatory diagram showing a state in which the rotatably configured LED modules 1 are arranged by being oriented toward the sub scanning direction. In the example as shown in FIG. 26, FIG. 27, FIG. 28, FIG. 29A to FIG. 29 E, FIG. 30A, and FIG. 30B, the light sources 11 of the LED modules 1 are arranged in a matrix. FIG. 27 shows an example in which the LED modules 1 in the inner rows In positioned at the position D are rotated outward by 90 degrees. It should be noted that the LED modules on the outer rows Ou are omitted. In this case, the output range of the ultraviolet ray at the position B becomes "1" to "100", and the output range of the ultraviolet ray at the position C becomes "1" to "200". At the position D, since high ultraviolet output can be obtained in the sub scanning direction by the LED modules 1 rotating, the output range thereof becomes "1" to "200". In the position D1, although the irradiation range is narrowed, the output range can be made larger without increasing the number of the LED modules 1, and the quantities of light different for each position can be obtained. From another aspect, the irradiation range by which the irradiation by the output "200" can be performed becomes the position C and the position D1, and is enlarged compared to a case without the rotation taking place.

Figure 28:
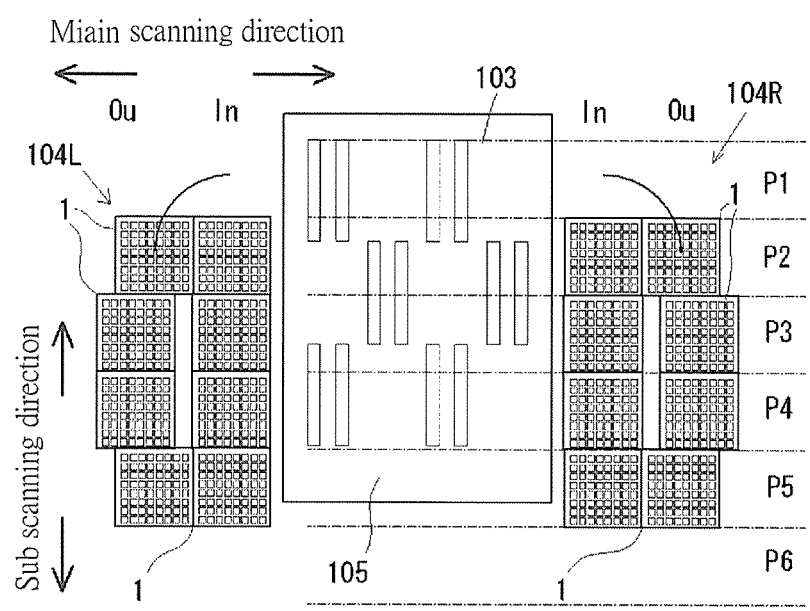
FIG. 28 is an explanatory diagram showing the configuration of the ultraviolet lamp of the inkjet printer of the embodiment 2 of this invention.

FIG. 28 shows an example in which the LED modules 1 in the inner rows In positioned at the position B and the position D are rotated outward by 90 degrees. According to the arrangement shown in the drawing, the output range of the position B2 can be set to "1" to "200". The output range of the position C is "1" to "200", and the output range of the position D1 is "1" to "200". At the position B2 and the position D1, although the irradiation range is narrowed, the output range can be made larger without increasing the number of the LED modules 1, and the quantities of light different for each position can be obtained. Further, the irradiation range by which the irradiation by the output "200" can be performed becomes the position B, the position C and the position D, which is further enlarged.

Further, the arrangement of the LED modules 1 may be in an arrangement that those shown in FIG. 27 and FIG. 28 are inverted in the sub scanning direction (not shown).

Configuration Example 1 of Ultraviolet Lamp

FIG. 29A to FIG. 29E are explanatory diagrams showing another configuration example of the rotary type ultraviolet lamps. The ultraviolet lamps 104 each arrange the LED modules 1 in a single row at the position B, the position C, and the position D. Further, the LED modules 1 are supported rotatably on the rails 2. As shown in FIG. 29A, in a normal state of use, the rectangular-shaped LED modules 1 are aligned in the sub scanning direction, so that the output range of the ultraviolet ray at the position B, the position C, and the position D is "1" to "100".

In the example shown in FIG. 29B, although the irradiation range is narrowed by rotating the LED modules 1 outward at the position D1 by 90 degrees, the output range can be widened to "1" to "200". From another aspect, the output range of "1" to "200" can be realized at a specific position even by a total of three LED modules 1. It should be noted that the arrangement shown in FIG. 29C has inverted the arrangement of FIG. 29B in the sub scanning direction.

Next, in the example shown in FIG. 29D, the LED modules 1 at the position B and the position D are rotated outward by 90 degrees, and the output range is widened to "1" to "200" at the position B2 and position D1. In this case, the output range can be set wide, namely "1" to "200", at a specific position by a total of three LED modules 1. It should be noted that the arrangement shown in FIG. 29E has inverted the arrangement of FIG. 29D in the sub scanning direction.

Configuration Example 2 of Ultraviolet Lamp

FIG. 30A and FIG. 30B are explanatory diagrams showing a characteristic arrangement example in case of providing one LED module 1 for each inner row In and one LED module 1 for each outer row Ou. In FIG. 30A, the LED modules 1 in the inner rows In are arranged at the position B and the LED modules 1 in the outer rows Ou are arranged in the position C. The LED modules 1 in the outer rows Ou are rotatably supported on the rails 2. In the case shown in FIG. 30A, the LED modules 1 in the outer rows Ou are rotated outward at the position C by 90 degrees.

In case of this arrangement, the output range of the ultraviolet ray at the position B becomes "1" to "100". The output range at the position C1 is widened to "1" to "200" although the irradiation range is narrower.

In FIG. 30B, the LED modules 1 in the inner rows In are arranged at the position B, and the LED modules 1 in the outer rows Ou are arranged at the position B, and the LED modules 1 in the outer rows Ou are rotated outward by 90 degrees. In case of this arrangement, the output range of the ultraviolet ray at the position B2 is widened to "1" to "300", and wide output range can be obtained at a specific position by the small number of LED modules 1.

Embodiment 3

Figure 31:
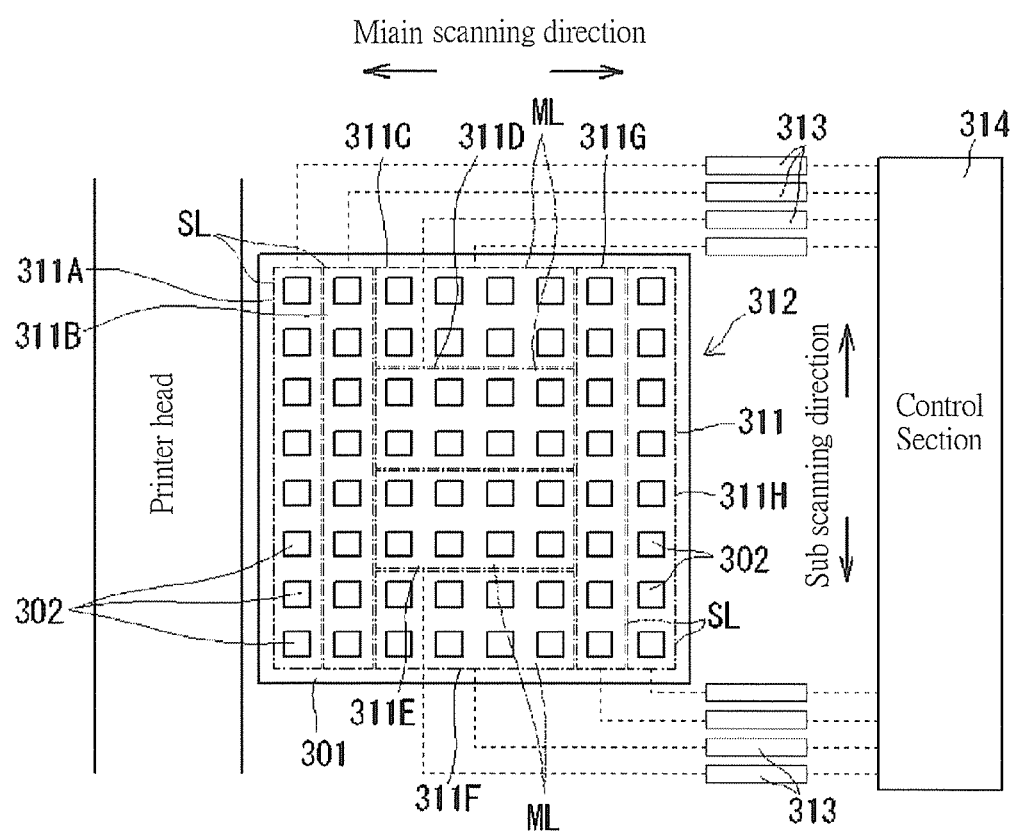
FIG. 31 is a configuration diagram showing an LED module member according to an embodiment 3 of this invention.

FIG. 31 is a configuration diagram showing a LED module member according to the embodiment 3 of the invention. This LED module member 312 can replace the LED module member 12 according to the embodiments 1 and 2. The LED module member 312 has a large number of LED elements 302 arranged in a matrix in the horizontal and vertical directions on a square-shaped substrate 301. The LED elements 302 are divided into groups that have grouped an arbitrary number of them in the main scanning direction and the sub scanning direction, and the LED elements 302 included in each group configure one LED light sources 311 (corresponding to the LED light source 11 of the embodiment 1). Each LED light sources 311 (group) has an irradiation unit 313 that can independently control the LED elements 302 included in this group as a whole connected thereto. The irradiation unit 313 is an electronic circuit that can collectively set illuminance for all of the LED elements 302 included in the group. The irradiation unit 313 is connected to a control section 314. The control section 314 controls the irradiation of the respective LED light sources 311 by sending a signal with a predetermined irradiation strength to the irradiation units 313.

The LED light source 311 in a main scanning direction group ML (a rectangular group having its longitudinal direction match the main scanning direction) is configured for example by arranging two rows, each of which has four LED elements 302 arranged in a line in the main scanning direction, in the sub scanning direction. Further, the LED light source 311 in a sub scanning direction group SL (a group having its longitudinal direction match the sub scanning direction) is configured for example by a row in which eight LED elements 302 are arranged in a line in the sub scanning direction.

In the LED module member 312, a group is formed by using a large number of cheap UVLED elements 302 as the LED elements 302, and the group is handled as one LED light source 311, so that there is no longer need to use expensive LED elements with strong illuminance, and the cost for the lamps can be reduced. Further, since the LED light source 311 can be formed by arbitrary arrangements from a large number of LED elements 302, various irradiation conditions can be handled. In the LED module member 312, the LED light sources 311 in the sub scanning direction groups SL are provided by two rows on each of right and left sides of the substrate 301 in the main scanning direction, and the LED light sources 311 in the main scanning direction groups ML are provided by four columns in the sub scanning direction, at the center of the substrate 301 between the sub scanning direction groups SL on the left side and the sub scanning direction groups SL on the right side.

It should be noted that the groups of the LED elements 302 shown in FIG. 31 are a mere example, and the settings of the groups are not limited hereto (others will be described later). The numbers of the LED light sources 311 and the irradiation units 313 corresponding thereto are preferably set to four to twelve, from the aspect of realizing detailed irradiation settings as the LED module member 312 and suppressing cost by suppressing the number of the irradiation units 313.

Further, in the LED module member 312, since the irradiation units 313 corresponding to each of the LED light sources 311 are provided, the illuminance can independently be set for each of the LED light sources 311. As each of the LED light sources 311, the sub scanning direction groups SL on the left side in the drawing will be denoted as LED light sources 311A, 311B, the sub scanning direction groups SL on the right side in the drawing will be denoted as LED light sources 311G, 311H, and the main scanning direction groups ML, the plurality of which are connected consecutively between the LED light sources 311A, 311B in the sub scanning direction groups SL and the LED light sources 311G, 311H in the sub scanning direction groups SL will be denoted LED light sources 311C, 311D, 311E, 311F from the upper side in the drawing.

As one example of the illuminance control, in case of strongly delivering ultraviolet ray at both ends in the sub scanning direction, the irradiation strength of the LED light sources 311C, 311F is increased by making current setting for the LED light sources 311C, 311F in the main scanning direction groups ML strong. As another example, in case of making the illuminance in the sub scanning direction variable, the LED light sources 311A, 311B, 311G, 311H in the sub scanning direction groups SL are turned off, and the illuminance of the LED light sources 311C, 311D, 311E, 311F in the main scanning direction groups ML is arbitrarily changed. For example, by making the illuminance gradually stronger in the order of LED light sources 311C, 311D, 311E, 311F, gradation in the illuminance can be formed in the sub scanning direction.

As yet another example, in case of making the illuminance in the main scanning direction variable, the illuminance of the LED light sources 311A, 311B, 311G, 311H in the sub scanning direction groups SL and the LED light sources 311C, 311D, 311E, 311F in the main scanning direction groups ML is arbitrarily changed, respectively (at which occasion the LED light sources 311C, 311D, 311E, 311F in the main scanning direction groups ML all have the same irradiation strength). For example, gradation in the illuminance can be formed in the main scanning direction by making the illuminance gradually stronger in the order of the LED light sources 311A, 311B, the LED light sources 311C to 311F, and the LED light sources 311G, 311H.

Next, in this LED module member 312, a total of sixty-four LED elements 302, which lay eight by eight vertically and horizontally, are provided on the square-shaped substrate 301 and are handled as one unit, so that the groupings can easily be performed according to the printer head size. That is, adaptation to various printer head sizes can be made by providing a necessary number of the LED module members 312 by connecting them consecutively, so that versatility as a component is increased. Further, by the adjacent formation in the main scanning direction or the sub scanning direction, as with the LED light sources 311A, 311B, or the LED light sources 311C to 311F, fine adjustment is enabled. Due to this, the ultraviolet irradiation onto the ink can appropriately be performed, whereby banding and the like are reduced, and the print quality is improved.

Figure 32:
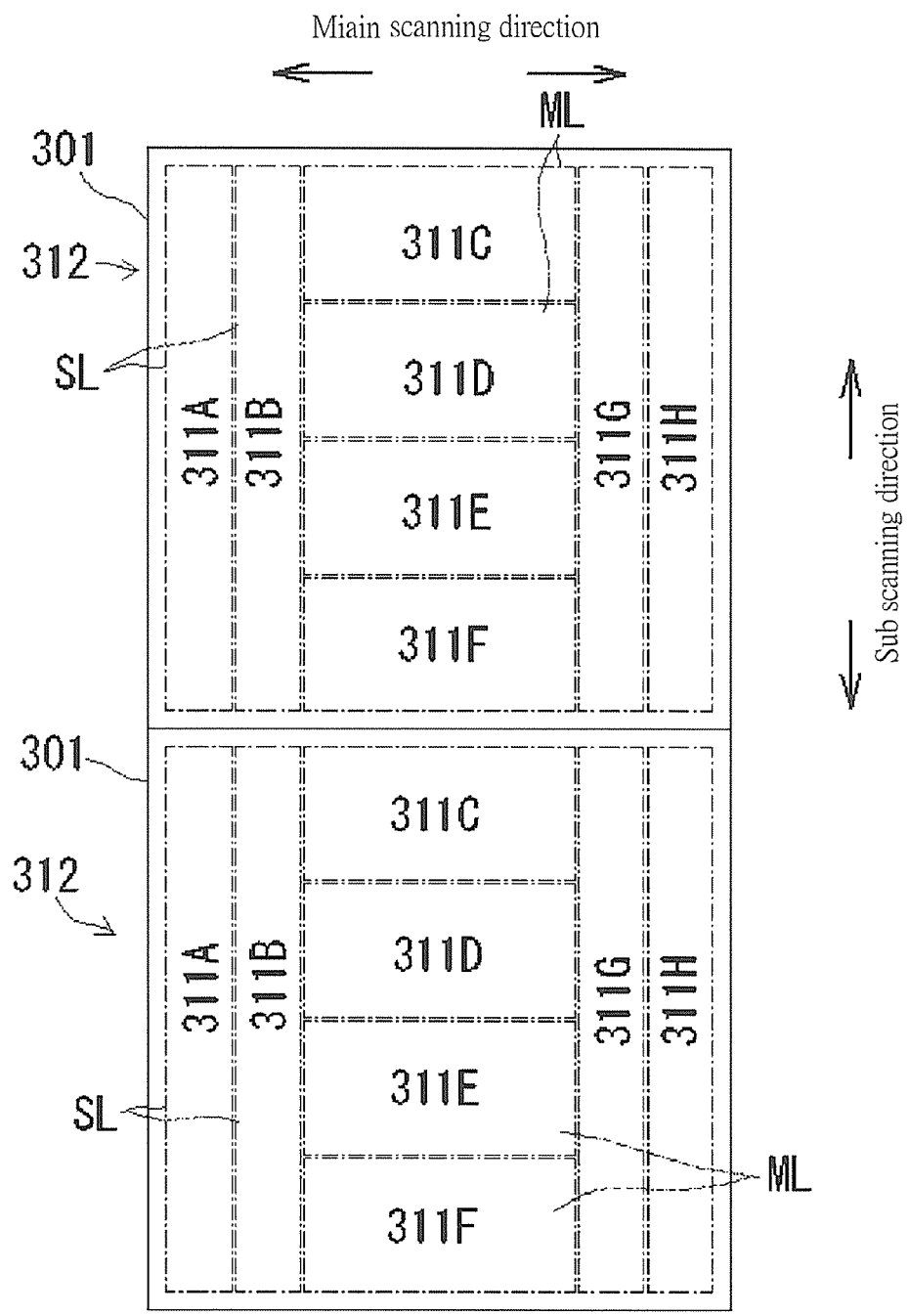
FIG. 32 is an explanatory diagram showing a state in which two LED module members are connected consecutively.

FIG. 32 is an explanatory diagram showing a state in which two LED module members are connected consecutively. The ultraviolet lamp is configured by consecutively connecting these LED module members 312 by a necessary number. The necessary number is determined in accordance with the size of the printer head. Due to this, the range by which the illuminance can be varied is widened in the direction along which the LED module members 312 are connected consecutively. For example, if two LED module members 312 are connected consecutively, the LED light sources (311 C to 311 F, 311 C to 311 F) in the sub scanning direction can be made variable continuously.

Figure 33:
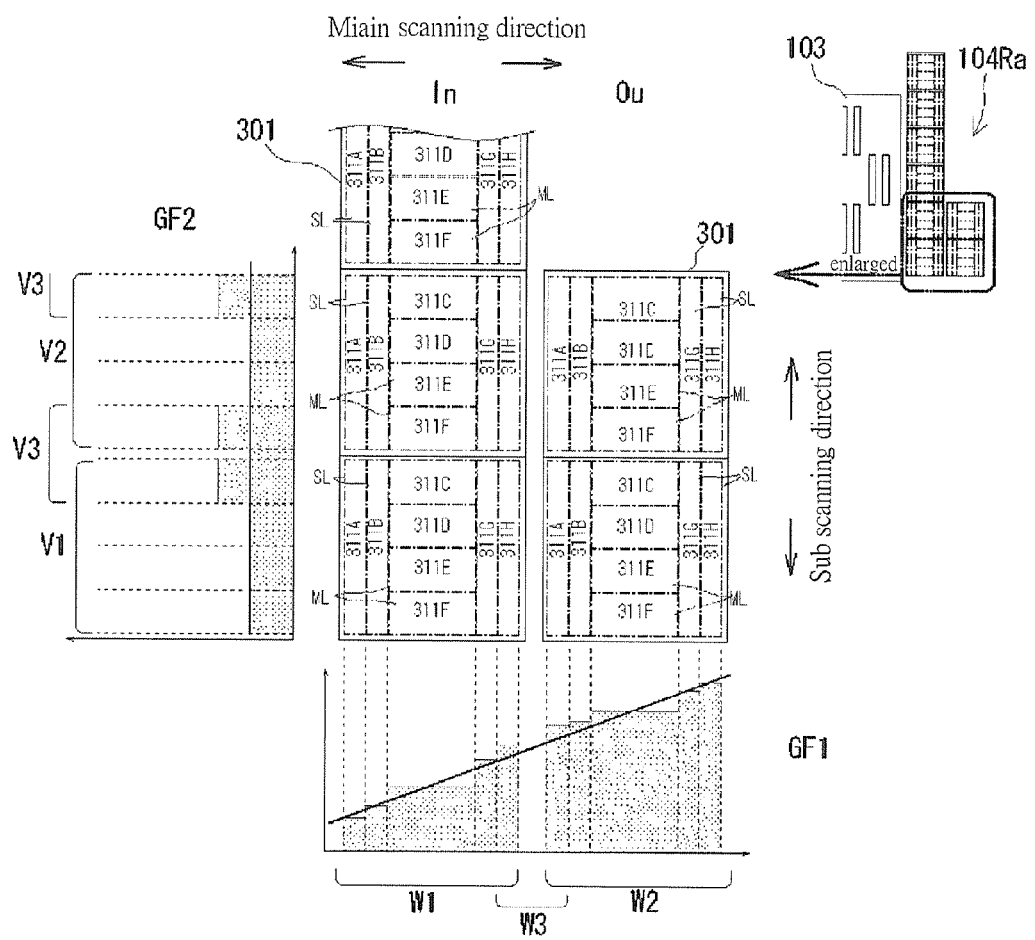
FIG. 33 is an explanatory diagram showing an example in which the LED module member of FIG. 31 is adapted to the ultraviolet lamp shown in FIG. 7A to FIG. 7C.

FIG. 33 is an explanatory diagram showing an example in which the LED module member of FIG. 31 is applied to the ultraviolet lamps shown in FIG. 7A to FIG. 7C. The LED module members 312 can replace the LED module members 12 in the ultraviolet lamps 104 of FIG. 7A to FIG. 7C. In the ultraviolet lamps 104Ra, six LED module members 312 are connected consecutively in the sub scanning direction in the inner row In, and two LED module members 312 are connected consecutively in the sub scanning direction in the outer row Ou. The LED module members 312 of the outer row Ou overlap with the LED module members 312 of the inner row In in the main scanning direction (are at the same position). The LED module members 312 can adjust the irradiation strength in units of LED light sources 311 also in the main scanning direction, so that the adjustable range of the irradiation strength can further be widened by consecutively connecting the LED module members 312 in the main scanning direction.

For example, a graph GF1 in FIG. 33 shows a case of setting the irradiation strength so that the irradiation strength becomes stronger toward the outside in the main scanning direction. It should be noted that in the graph GF1, the irradiation strength is shown by hatched portions. Variation is enabled in the range that adds up an irradiation range W1 by the LED module members 312 in the inner row In and an irradiation range W2 by the LED module members 312 in the outer row Ou. In the example of this graph, the illuminance is set so that the irradiation strength of the initial ultraviolet ray from the left side in the drawing is weak, and the illuminance is gradually increased. By controlling as above, generation of wrinkles caused by an abrupt curing of ink is prevented.

Further, as shown in the graph GF1, in case of linearly increasing the strength in the irradiation ranges W1, W2, there is a joint between the LED module members 312, so the irradiation strength is reduced at this joint portion W3. Due to this, the irradiation strength is slightly increased for the LED light sources 311 at the ends of the LED module members 312 (LED light sources 311H, 311A in the sub scanning direction groups SL) so that the irradiation strength does not decrease at the joint portion W3, and the drop in the illuminance at this joint portion W3 is prevented. As above, by configuring the irradiation strength to be variable for each LED light source 311, an influence by the joint upon consecutively connecting the LED module members 312 becomes capable of being corrected.

Next, in the sub scanning direction, as shown in a graph GF2 in FIG. 33, irradiation by a uniform strength in irradiation ranges V1, V2 is to be performed by the LED module members 312. It should be noted that in the graph GF2, the irradiation strength is shown by hatched portions. At this occasion, the LED light sources 311 of the necessary main scanning direction groups ML are lit at the same strength in the sub scanning direction. Due to this, uniform irradiation of the ultraviolet ray in the range of the consecutively connected LED module members 312 is enabled. In this case as well, since the irradiation strength may drop at a joint portion V3 between the LED module members 312, the irradiation strength of the LED light sources 311 at the ends of the LED module members 312 (LED light sources 311C, 311F of the main scanning direction groups ML) is slightly increased so that the illuminance drop at the joint portion V3 is prevented. Due to this, the illuminance drop at the joint portion V3 is corrected, and a flat irradiation strength property is obtained as a whole.

As above, by replacing the LED module members 11 in the ultraviolet lamps according to the embodiment 1 by the LED module members 312, the inkjet printer having the aforementioned workings and effects can be realized. Especially, at the position where the LED module members 312 on the inside In and the LED module members 312 on the outside Ou overlap in the main scanning direction, the irradiation strength of the ultraviolet ray can be configured to be variable in a wide range.

Figure 34:
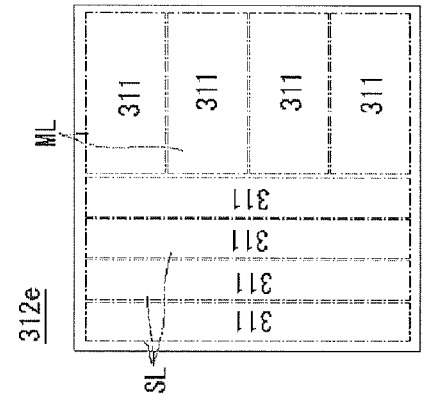
FIG. 34A to FIG. 34E are explanatory diagrams showing a setting example of LED light sources in the LED module member.
Figure 34:
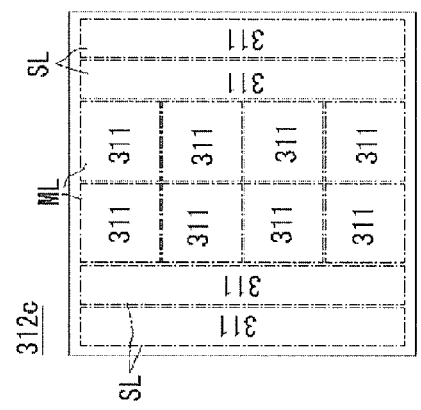
Figure 34:
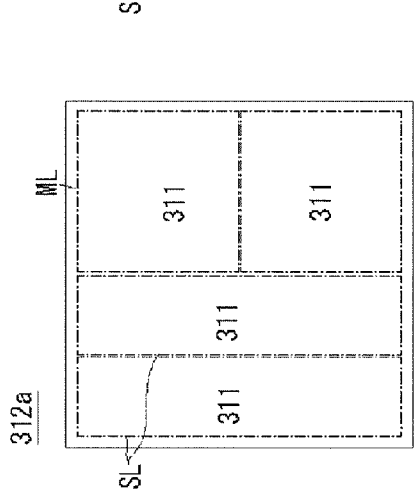
Figure 34:
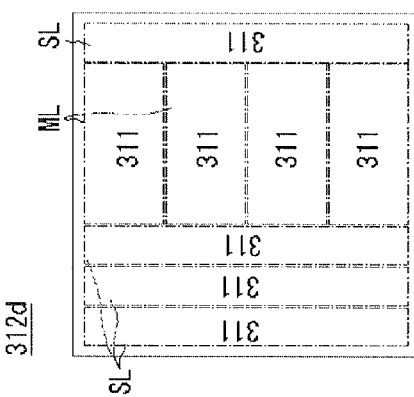
Figure 34:
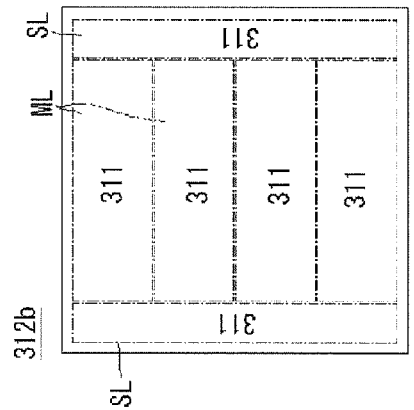

FIG. 34A to FIG. 34E are explanatory diagrams showing setting examples of the LED light sources of the LED module member. As shown in FIG. 34A, LED light sources 311 in the sub scanning direction groups SL of the LED module member 312a are formed in two rows on the left side of the substrate 301, and the LED light sources 311 in the main scanning direction groups ML are formed in two rows on the right side of the substrate 301 in the sub scanning direction. It should be noted that the number of the physical LED elements 302 formed on the substrate 301 may be a total of sixty-four which lay eight by eight vertically and horizontally, similar to the above, or hundred which lay ten by ten, or thirty-six which lay six by six (the same applies hereinbelow). The number of the LED elements 302 included in each LED light source 311 shown in FIG. 32 to FIG. 36 will be based on the actual number provided on the substrate 301.

Further, as shown in FIG. 34B, LED light sources 311 in the sub scanning direction groups SL of the LED module member 312b are formed in one row on each of the left and right sides of the substrate 301, and the LED light sources 311 in the main scanning direction groups ML are formed in four rows at a center of the substrate 301, and between the LED light sources 311 of the sub scanning direction groups SL in the sub scanning direction. In this case, since the irradiation strength of each LED light source 311 in the sub scanning direction groups SL is increased, the variable range of the illuminance in the sub scanning direction can be widened.

Further, as shown in FIG. 34C, LED light sources 311 in the sub scanning direction groups SL of the LED module member 312c are formed in two rows on each of the left and right sides of the substrate 301, and the LED light sources 311 in the main scanning direction groups ML are formed in four rows in the sub scanning direction and two rows in the main scanning direction at a center of the substrate 301, and between the LED light sources 311 in the sub scanning direction groups SL. In this case, since the LED light sources 311 in the main scanning direction groups ML are formed finely, the same illuminance can be varied in the main scanning direction as FIG. 32, and if the LED light sources 311 in the main scanning direction groups ML are set to be of the same illuminance in the sub scanning direction, the LED light sources 311 in the main scanning direction groups ML can be handled similar to the LED light sources 311 in the sub scanning direction groups SL. That is, the configuration becomes identical to a configuration in which the LED light sources 311 in the sub scanning direction groups SL are formed in six rows in the main scanning direction. In this case, the irradiation strength adjustment can smoothly be performed in the main scanning direction. It should be noted that although each LED light source 311 in the main scanning direction groups ML is substantially square in FIG. 34C, however, it may be configured by a rectangular shape (not shown). Further, since the LED light sources 311 in the main scanning direction groups ML are formed finely, if the upper half and lower half of the LED light sources 311 in the main scanning direction groups ML are set to the same illuminance, they can be dealt as being the same size as large LED light sources 311 as shown in FIG. 34A.

Further, as shown in FIG. 34D, the LED light sources 311 in the sub scanning direction groups SL of the LED module member 312d are formed in three rows on the left side and one row in the right side of the substrate 301, and the LED light sources 311 in the main scanning direction groups ML are formed in four rows in the sub scanning direction at a center of the substrate 301, and between the LED light sources 311 in the sub scanning direction groups SL. In this case, the initial ultraviolet ray irradiation in the main scanning direction can be set strong. Further, in case of consecutively connecting the LED module members 312d in the main scanning direction, since the LED light sources 311 in the sub scanning direction groups SL with the high irradiation strength are arranged on both sides of the LED light sources 311 in the main scanning direction groups ML, the setting of the illuminance can be performed in a wider range (a similar configuration example will be described later in FIG. 35).

Further, as shown in FIG. 34E, the LED light sources 311 in the sub scanning direction groups SL of the LED module member 312e are formed in four rows on the left side of the substrate 301, and the LED light sources 311 in the main scanning direction groups ML are formed in four rows on the left side of the substrate 301 in the sub scanning direction. In this case, the initial ultraviolet ray irradiation in the main scanning direction can be set stronger. Further, in case of consecutively connecting the LED module members 312e in the main scanning direction, since the LED light sources 311 in the sub scanning direction groups SL with the high irradiation strength are arranged on both sides of the LED light sources 311 in the main scanning direction groups ML, the setting of the illuminance can be performed in a wider range (a similar configuration example will be described later in FIG. 35).

Figure 35:
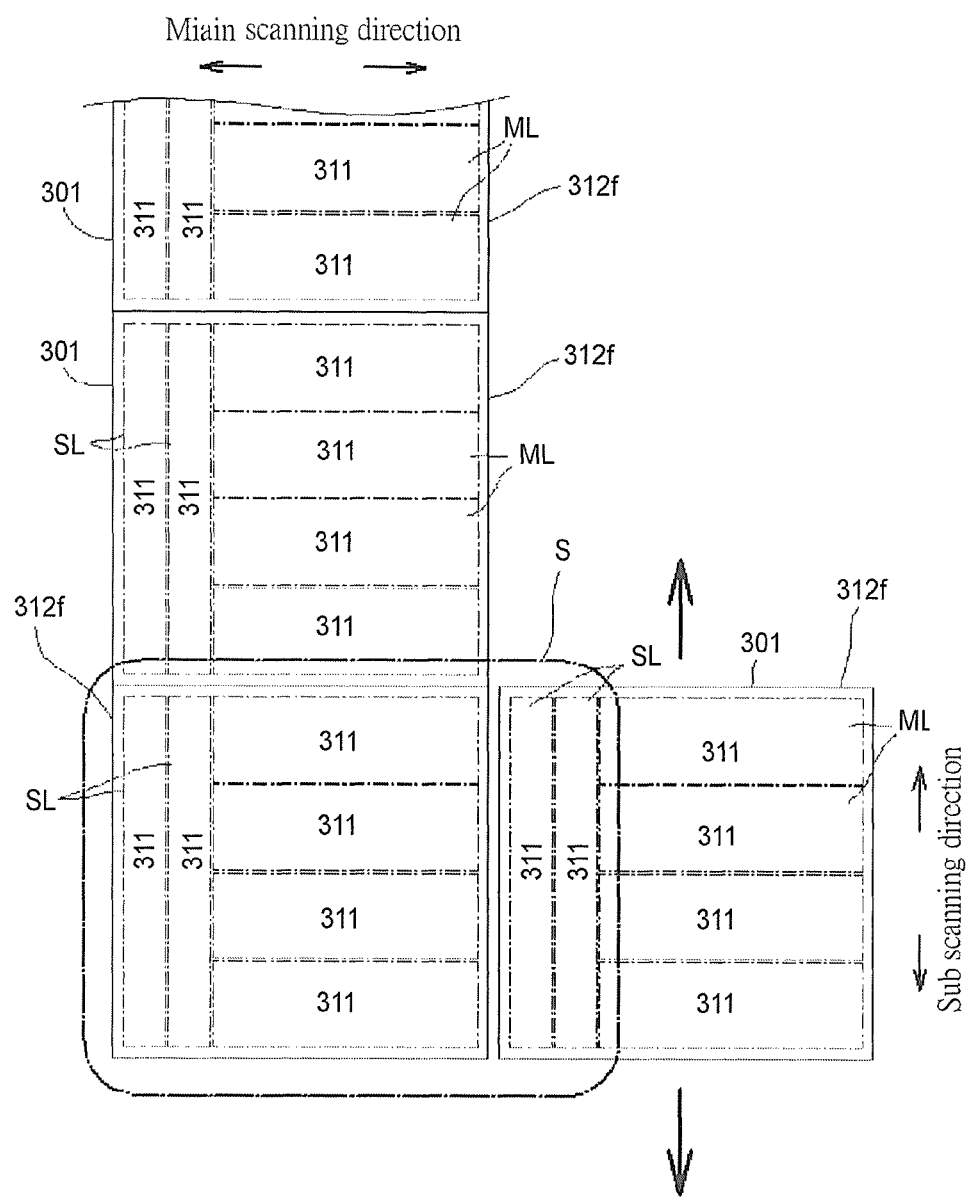
FIG. 35 is an explanatory diagram showing an arrangement example of the LED module member in the ultraviolet lamp of the inkjet printer.

FIG. 35 is an explanatory diagram showing an arrangement example of the LED module members in the ultraviolet lamp of the inkjet printer. In this ultraviolet lamp 104, as the LED module members 312f, those having the LED light sources 311 in the sub scanning direction groups SL formed in two rows on the left side of the substrate 301 and the LED light sources 311 in the main scanning direction groups ML formed in four rows on the right side in the sub scanning direction are used. A plurality of the LED module members 312f is connected consecutively in the sub scanning direction in the inner row In, and one LED module member 312f is provided in the outer row Ou. The LED module member 312f in the outer row Ou can move in the sub scanning direction. Here, among the portion where the LED module members 312f of the inner row In and the outer row Ou overlap in the main scanning direction, when a portion S surrounded by a dotted line in the drawing is assumed as one virtual LED module member, this virtual LED module member becomes equal to the configuration of the LED module member 312 shown in FIG. 33, in which the LED light sources 311 in the sub scanning direction groups SL are formed in two rows on each of the right and left sides of the substrate 301, and the LED light sources 311 in the main scanning direction groups ML are formed in four rows in the sub scanning direction at a center of the substrate 301 and between the LED light sources 311 in the sub scanning direction groups SL.

In case of a single LED module member 312f (case where they do not overlap in the main scanning direction), since the LED light sources 311 in the sub scanning direction groups SL are arranged adjacent in the module, it is difficult to deliver ultraviolet ray with time difference, however, by recognizing the virtual LED module member at the portion overlapped in the main scanning direction, the irradiation timing of the LED light sources 311 of the sub scanning direction groups SL are set so that the time from the ink discharge to the ultraviolet irradiation can be varied. The setting of such a virtual LED module member is performed by the control section 314. As above, by moving the LED module member in the outer row Ou in the sub scanning direction, an arrangement of the LED light sources 311 differing from other LED module members can be realized at the overlapped portion in the main scanning direction.

Figure 36:
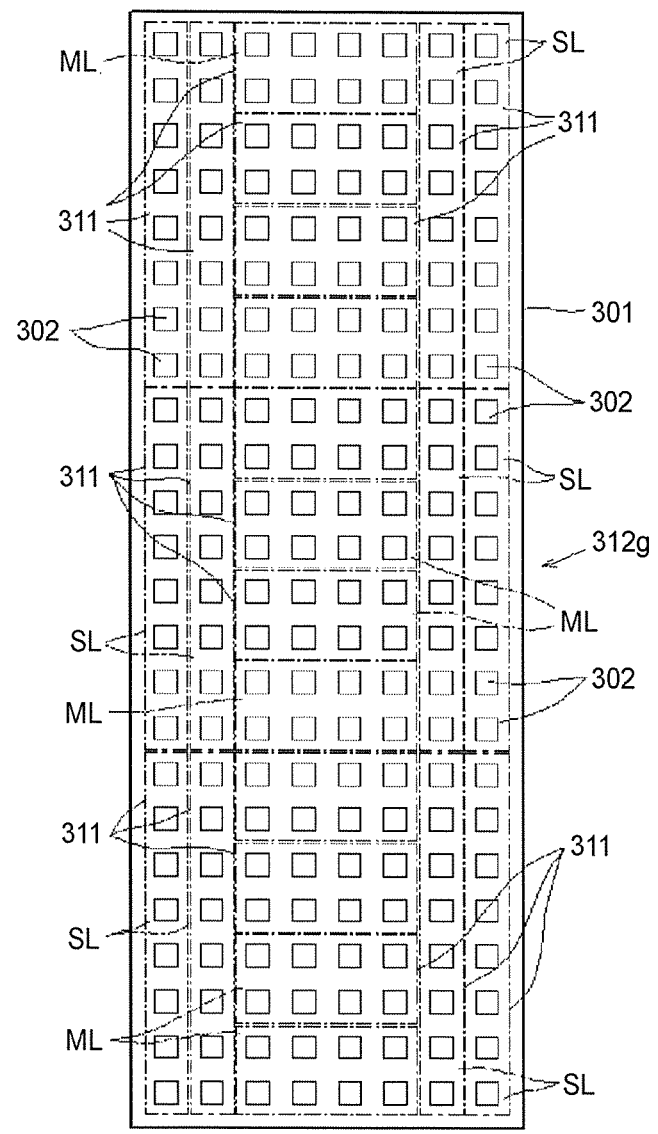
FIG. 36 is an explanatory diagram showing another LED module member.

FIG. 36 is an explanatory diagram showing another LED module member. In the aforementioned example, LED module member 312g is configured by forming the LED elements 302 in a matrix on the square substrate 301, however, as shown in this drawing, the substrate 301 may be manufactured in accordance with the size of the printer head. The substrate 301 shown in FIG. 36 is rectangular, and has the same length as the printer head (not shown). A total of hundred and ninety-two LED elements 302, in which for example twenty four of them are laid vertically and eight of them are laid horizontally, are formed on this substrate 301.

Further, the LED light sources 311 in the sub scanning direction groups SL and the main scanning direction groups ML are set to these hundred and ninety-two LED elements 302. In this drawing, the LED light sources 311 in the sub scanning direction groups SL are fainted on the right and left in two rows each, and up and down in three rows. The LED light sources 311 in the main scanning direction groups ML are formed in twelve rows in the sub scanning direction at a center of the substrate 301, and between the LED light sources 311 in the sub scanning direction groups SL. As above, since no joint is formed by configuring the LED module member 312g using the substrate 301 dedicated for each printer head, uniform irradiation becomes possible without adjusting the irradiation at the joint portion.

DESCRIPTION OF REFERENCE SIGNS

100: Inkjet printer
102: Carriage
103: Holder

104: Ultraviolet lamp
105: Printer head
1: LED module
2: Rail
12, 312: LED module member
11, 311: LED light source

The invention claimed is:

1. An inkjet recording device configured to move a printer head in a main scanning direction relative to a medium while discharging ink onto the medium, and including a lamp that causes the discharged ink to be exposed and cured in the main scanning direction of the printer head, the inkjet recording device comprising:
   a plurality of irradiation units configuring the lamp and disposed in the main scanning direction relative to the printer head; and
   a retaining unit that retains at least one irradiation unit among the plurality of irradiation units to be movable in a sub scanning direction perpendicularly intersecting the main scanning direction relative to the printer head, and
   the irradiation units are provided at least on one side of the printer head from a printer head side to the main scanning direction, as an inner row and an outer row,
   the irradiation units disposed in the inner row and the outer row are relatively movable in the sub scanning direction.

2. The inkjet recording device according to claim 1, wherein
   the retaining unit retains the plurality of irradiation units at a specific position in the sub scanning direction, and
   a total quantity of light in the main scanning direction at the position is changed for a plurality of printing directions.

3. The inkjet recording device according to claim 1, wherein
   the retaining unit are rails, which are provided on both sides of the printer head in parallel and provided in the main scanning direction, and
   each of the irradiation units is arranged respectively in the main scanning direction by being arranged with the rails.

4. The inkjet recording device according to claim 3, wherein
   a length of each of the rails is longer than a length of the printer head in the sub scanning direction, and projects out toward both sides of the printer head in the sub scanning direction.

5. An inkjet recording device configured to move a printer head in a main scanning direction relative to a medium while discharging ink onto the medium, and including a lamp that causes the discharged ink to be exposed and cured in the main scanning direction of the printer head, the inkjet recording device comprising:
   a plurality of irradiation units configuring the lamp and provided in the main scanning direction of the printer head; and
   a retaining unit that retains at least one irradiation unit among the plurality of irradiation units to be movable in a sub scanning direction perpendicularly intersecting the main scanning direction, wherein
   the retaining unit creates contrasts in the total quantity of light in the main scanning direction between a specific position and other positions by retaining the plurality of irradiation units at the specific position in the sub scanning direction, and
   when a feeding direction of the medium relative to the printer head changes from a forward direction to a reverse direction,
   the retaining unit is capable of moving the irradiation units in the sub scanning direction so as to invert the total quantity of light in the forward direction.

6. An inkjet recording device configured to move a printer head in a main scanning direction relative to a medium while discharging ink onto the medium, and including a lamp that causes the discharged ink to be exposed and cured in the main scanning direction of the printer head, the inkjet recording device comprising:
   a plurality of irradiation units configuring the lamp and provided in the main scanning direction of the printer head; and
   a retaining unit that retains at least one irradiation unit among the plurality of irradiation units to be movable in a sub scanning direction perpendicularly intersecting the main scanning direction, wherein
   in case of a magnitude of the total quantity of light in the main scanning direction at the specific position being made to differ from those of other positions, and provisionally curing the other positions with a small quantity of light and thereafter primarily curing the specific position,
   in case where a feeding direction of the medium is a forward direction, the retaining unit moves and retains the irradiation unit so that a total quantity of light becomes large at a downstream side of the printer head relative to the medium, and
   in case where the feeding direction of the medium is a reverse direction, the retaining unit moves and retains the irradiation unit to arrange the irradiation unit to be in an arrangement that is inverted in the sub scanning direction of the printer head, so that the total quantity of light becomes large at the downstream side of the printer head relative to the medium becomes large.

7. An inkjet recording device configured to move a printer head in a main scanning direction relative to a medium while discharging ink onto the medium, and including a lamp that causes the discharged ink to be exposed and cured in the main scanning direction of the printer head, the inkjet recording device comprising:
   a plurality of irradiation units configuring the lamp and provided in the main scanning direction of the printer head; and
   a retaining unit that retains at least one irradiation unit among the plurality of irradiation units to be movable in a sub scanning direction perpendicularly intersecting the main scanning direction, wherein
   the irradiation units are configured of module members that:
     have a large number of light emitting elements arranged in horizontal and vertical directions on a substrate, and
     the irradiation units include:
       a main scanning direction group of light sources configured to be capable of independently controlling the light emitting elements arranged in the main scanning direction as a whole among the large number of light emitting elements; and
       a sub scanning direction group of light sources configured to be capable of independently controlling the light emitting elements arranged in the sub scanning direction as a whole among the large number of light emitting elements.

8. The inkjet recording device according to claim 7, wherein
   the sub scanning direction groups of light sources are further formed on both sides of the substrate, and the main scanning direction group of light sources is formed between the sub scanning direction groups.

9. The inkjet recording device according to claim 7, wherein a plurality of main scanning direction groups of light sources is further included, and the light sources are formed adjacently in the sub scanning direction.

10. The inkjet recording device according to claim 7, wherein a plurality of sub scanning direction groups of light sources is further included, and the light sources are formed adjacently in the main scanning direction.

* * * * *